United States Patent
Lee et al.

(10) Patent No.: US 12,498,169 B2
(45) Date of Patent: Dec. 16, 2025

(54) HOME APPLIANCE AND METHOD FOR CONTROLLING THE SAME

(71) Applicant: LG Electronics Inc., Seoul (KR)

(72) Inventors: Ikkyu Lee, Seoul (KR); Doyoun Han, Seoul (KR); Woohyuk Choi, Seoul (KR); Changseok Ock, Seoul (KR)

(73) Assignee: LG Electronics Inc., Seoul (KR)

( * ) Notice: Subject to any disclaimer, the term of this patent is extended or adjusted under 35 U.S.C. 154(b) by 121 days.

(21) Appl. No.: 18/236,266

(22) Filed: Aug. 21, 2023

(65) Prior Publication Data

US 2024/0068740 A1    Feb. 29, 2024

(30) Foreign Application Priority Data

Aug. 26, 2022  (KR) .................. 10-2022-0107254

(51) Int. Cl.
*F25D 27/00*    (2006.01)

(52) U.S. Cl.
CPC ........ *F25D 27/005* (2013.01); *F25D 2400/18* (2013.01)

(58) Field of Classification Search
CPC .... F25D 27/00; F25D 27/005; F25D 2500/04; F25D 2400/18; F25D 2400/36; F25D 2600/06
See application file for complete search history.

(56) References Cited

U.S. PATENT DOCUMENTS

| | | | | |
|---|---|---|---|---|
| 9,984,660 | B2 * | 5/2018 | Kim | G09G 5/14 |
| 2020/0034688 | A1 * | 1/2020 | Lim | G06N 3/08 |
| 2020/0041200 | A1 * | 2/2020 | No | G05B 19/048 |
| 2023/0258388 | A1 * | 8/2023 | Yu | F25D 29/00 |
| | | | | 312/405 |

FOREIGN PATENT DOCUMENTS

| | | | | | |
|---|---|---|---|---|---|
| CN | 113945058 | A | * | 1/2022 | |
| EP | 3311707 | A1 | * | 4/2018 | ........... A47F 3/0426 |
| KR | 1020050095359 | A | * | 9/2005 | |
| KR | 1020180025047 | A | * | 3/2018 | |
| KR | 20190022608 | A | * | 3/2019 | |
| KR | 20220073626 | A | * | 6/2022 | ........... F25D 27/005 |
| WO | WO-2004015327 | A2 | * | 2/2004 | ............. A47B 97/00 |
| WO | WO-2018135502 | A1 | * | 7/2018 | |
| WO | WO-2021112409 | A1 | * | 6/2021 | ........... F25D 23/028 |
| WO | WO-2021212934 | A1 | * | 10/2021 | |

* cited by examiner

*Primary Examiner* — Andrew Roersma
(74) *Attorney, Agent, or Firm* — Fish & Richardson P.C.

(57) ABSTRACT

A home appliance includes: a cabinet defining a storage space, a plurality of doors configured to open and close the storage space, a plurality of lighting devices provided in the plurality of doors, respectively, and configured to show a color of each door, and a control unit configured to control the plurality of lighting devices. The control unit is configured to, based on a color of one door of the plurality of doors being input, control the plurality of lighting devices to synchronize the colors of the plurality of doors to be the same.

17 Claims, 18 Drawing Sheets

HOME APPLIANCE AND METHOD FOR CONTROLLING THE SAME

CROSS-REFERENCE TO RELATED APPLICATIONS

The present application claims priority under 35 U.S.C. 119 and 35 U.S.C. 365 to Korean Patent Application No. 10-2022-0107254, filed on Aug. 26, 2022, which is hereby incorporated by reference in its entirety.

BACKGROUND

The present disclosure relates to a home appliance and a method for controlling the same.

In general, home appliances are electric devices used at home, and various functions of the home appliances are being opened and upgraded according to the improvement of living standards and changes in the living environment.

Such a home appliance may include a cabinet having a front surface defining an opening space and a door that opens and closes the opened front surface of the cabinet. In addition, an exterior of the front surface of the home appliances may be defined by the door in an installed state. The home appliance having such a structure may include a refrigerator, a clothes care machine, a washing machine, a cooking appliance, a dishwasher, and the like.

The home appliance may be mainly installed in an indoor space or may be installed in a built-in type embedded in furniture or a wall. In addition, the home appliance may be configured to have an outstanding appearance in the installed state or to harmonize with the surrounding environment. In addition, a plurality of home appliances may be placed side by side with each other or placed adjacent to each other to harmonize a unified appearance.

Thus, structures for diversifying the exterior of the front surface of the home appliance are being developed to harmonize with the environment, in which the home appliance is placed, or surrounding furniture or home appliances.

Particularly, the exterior of the home appliance may be defined by a panel provided on the door, and the panel may be made of various materials.

SUMMARY

Embodiments provide a home appliance having a plurality of doors, which appear to have the same color, and a method for controlling the home appliance.

Embodiments also provide a home appliance in which an operation of a lighting device is adjustable so that doors having different sizes appear to have the same color, and a method for controlling the home appliance.

Embodiments also provide a home appliance, in which doors of a plurality of home appliances appear to have the same color, and a method for controlling the home appliance.

Embodiments also provide a home appliance having patterns in which exteriors of doors of a plurality of home appliances are interlocked with each other, and a method for controlling the home appliance.

In one embodiment, a home appliance includes: a cabinet defining a storage space; a plurality of doors configured to open and close the storage space; a plurality of lighting devices provided in the doors, respectively, and configured to express a color of each door; and a control unit configured to control the plurality of lighting devices, wherein, when a color of one door of the plurality of doors is input, the control unit is configured to control the plurality of lighting devices so that the colors of the plurality of doors are the same.

The home appliance may further include a communication unit configured to communicate with a server in which information of the home appliance is stored, wherein the control unit may be configured to control the plurality of lighting devices according to operation information of the plurality of lighting devices, which are received from the server.

The plurality of doors may have door specifications different from each other, wherein the door specifications may include at least one of: a color of a panel configured to define a front surface of the door; a size of the door; or a structure of the lighting device.

The lighting devices of the doors having the door specifications different from each other may be controlled according to operation information different from each other.

The home appliance may further include a manipulation unit through which the colors of the doors are input.

The home appliance may further include a mobile device which is connected to the server and into which the colors of the doors are input.

At least one door of the plurality of doors may include: a see-through portion through which a space within a refrigerator is seen; and a see-through portion light configured to allow a rear space of the see-through portion to be visible according to turn on/off thereof and configured to emit light having various colors, wherein the control unit may be configured to control the see-through portion light to be synchronized with an operation of the lighting device so as to operate together.

The control unit may be configured to control the see-through portion light so that the color of the door provided in the lighting device and a color of the see-through portion are the same.

The home appliance may be provided in plurality, and when a color of the door of one home appliance is input, the control unit may be configured to control the lighting devices of the plurality of home appliances so that colors of the doors of the remaining home appliances are the same.

The plurality of home appliances may include at least two or more combinations of a refrigerator, a cooking appliance, a dishwasher, a clothes care machine, and a washing machine.

The plurality of home appliances may include different home appliances having door specifications different from each other, wherein the door specifications may include at least one of: a color of a panel configured to define a front surface of the door; a size of the door; or a structure of the lighting device.

When an output pattern of the door is input, the control unit may be configured to control the lighting devices of the plurality of home appliances so that the lighting devices of the plurality of home appliances are interlocked with each other to operate.

The control unit may be configured to allow other home appliances to operate based on an operation time or sequence of the lighting device of any one of the plurality of home appliances.

The lighting device may be constituted by a plurality of RGB LEDs disposed on the substrate to selectively emit light having various colors.

In another embodiment, a method for controlling a home appliance includes: recognizing the home appliance in a server; inputting a color of any one of a plurality of doors of the home appliance; matching operation information of lighting devices provided in the plurality of doors to output the input colors of the doors; and allowing the lighting device to operate so that the colors of the plurality of doors are the same according to the operation information.

Operation information of the lighting device of the door, of which a color is not input, of the plurality of doors may be transmitted to the control unit of the home appliance after the matching in the server.

The home appliance may be provided in plurality, and each of the home appliances is recognized in the server.

Operation information of the lighting devices may match each other according to door specifications of the plurality of home appliance.

The door specifications may include at least one of a color of a panel configured to define a front surface of the door, a size of the door, or a structure of the lighting device.

The method may further include inputting an output pattern appearing on the doors of the plurality of home appliances, wherein, when the output pattern is input, the lighting devices of the plurality of home appliances may express the output pattern by operations interlocked with each other.

The details of one or more embodiments are set forth in the accompanying drawings and the description below. Other features will be apparent from the description and drawings, and from the claims.

DETAILED DESCRIPTION OF THE EMBODIMENTS

Hereinafter, detailed embodiments will be described in detail with reference to the accompanying drawings. However, the present disclosure is limited to the embodiments in which the spirit of the present invention is proposed, and other degenerate idea or other embodiments included in the scope of the present invention may be easily proposed by addition, changes, deletions, etc. of other elements.

In addition, the embodiment of the present disclosure is described based on a refrigerator among home appliances for the convenience of understanding and description, but the embodiment of the present disclosure is not limited thereto and may be used for all home appliances provided with doors.

Prior to a description, directions are defined. In an embodiment of the present disclosure, a direction toward a door is defined as a front direction with respect to a cabinet shown in FIGS. 3 and 2, a direction toward the cabinet with respect to the door is defined as a rear direction, a direction toward a bottom on which a refrigerator is installed is defined as a downward direction, and a direction away from the bottom is defined as an upward direction.

Figure 1:
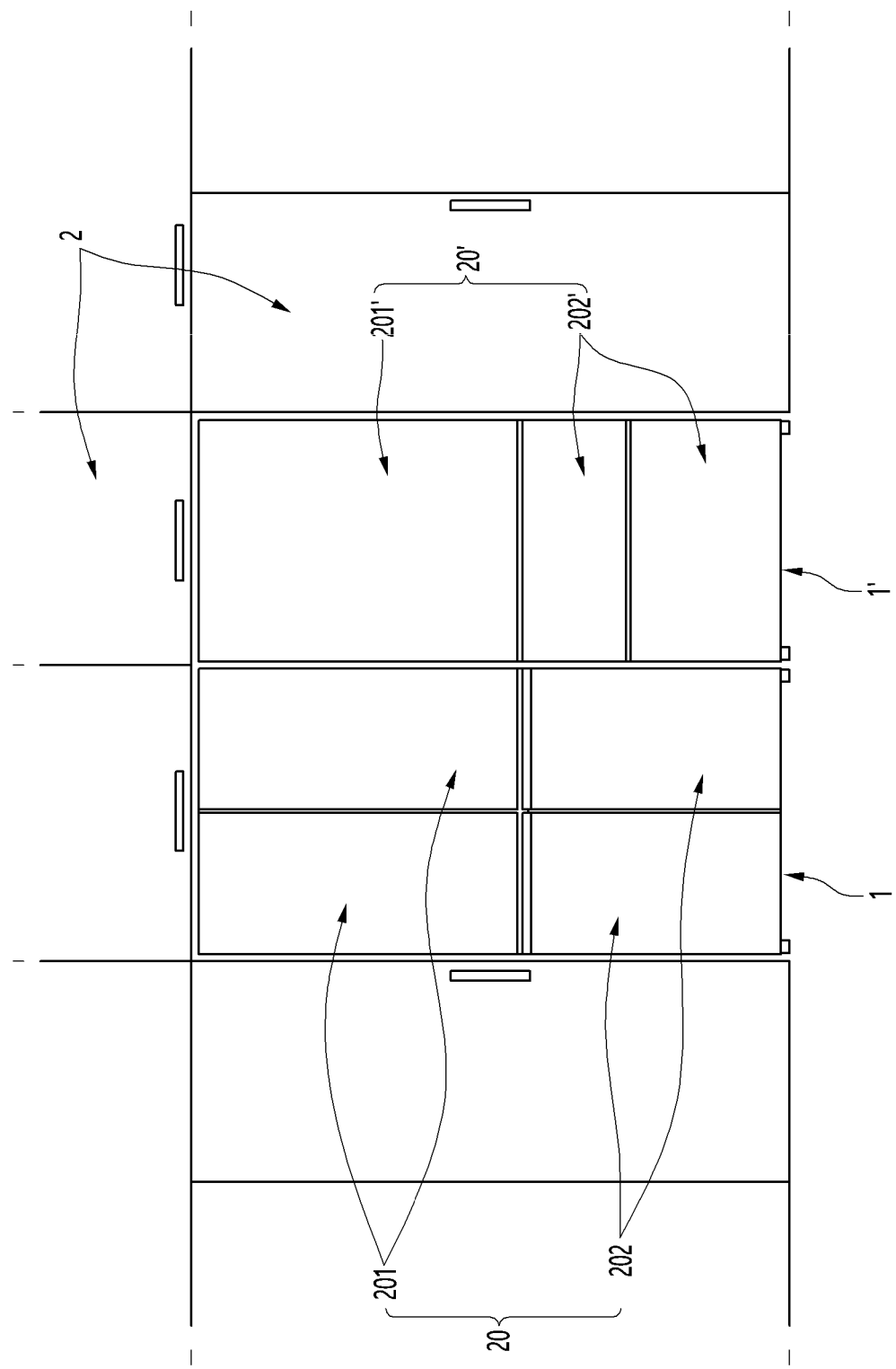
FIG. 1 is a front view illustrating a state in which refrigerators are installed according to an embodiment.
Figure 2:
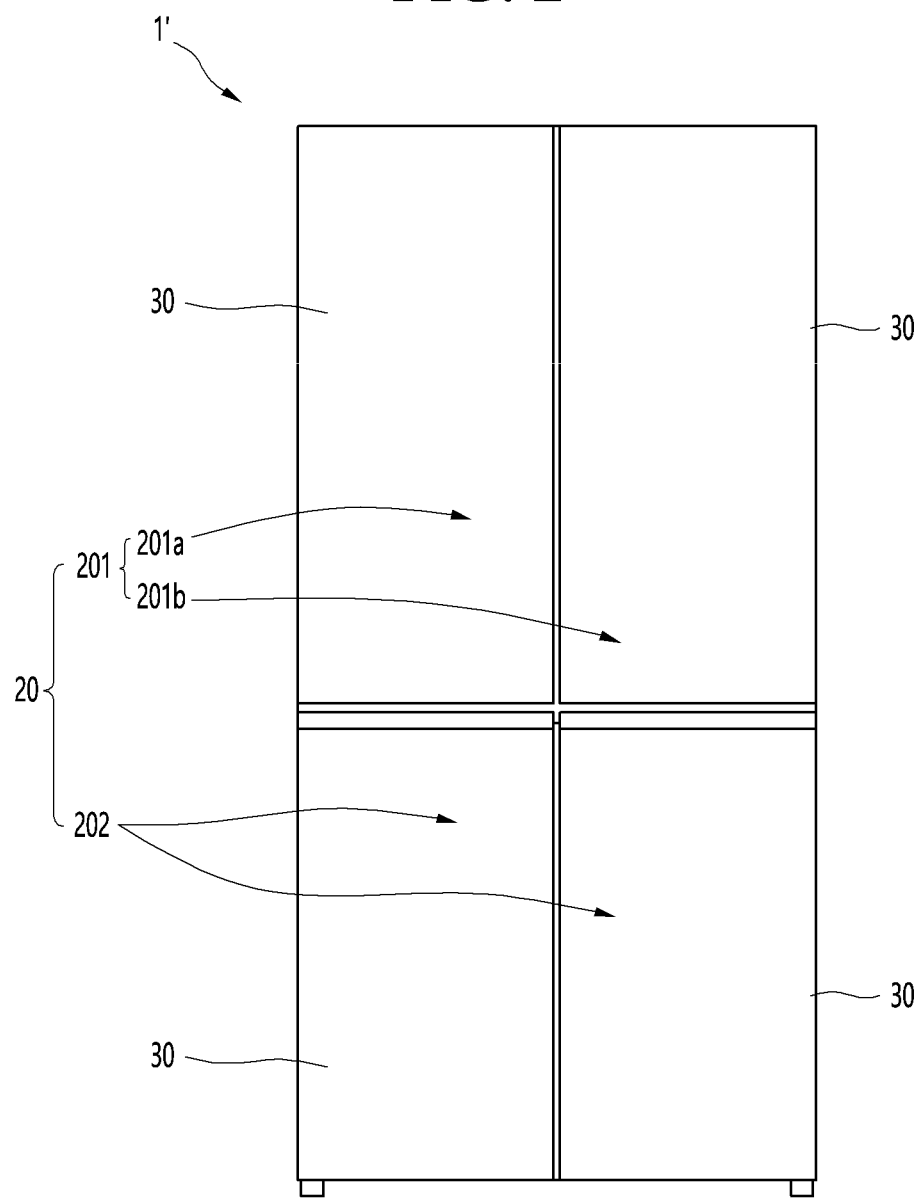
FIG. 2 is a front view of a refrigerator according to an embodiment.
Figure 3:
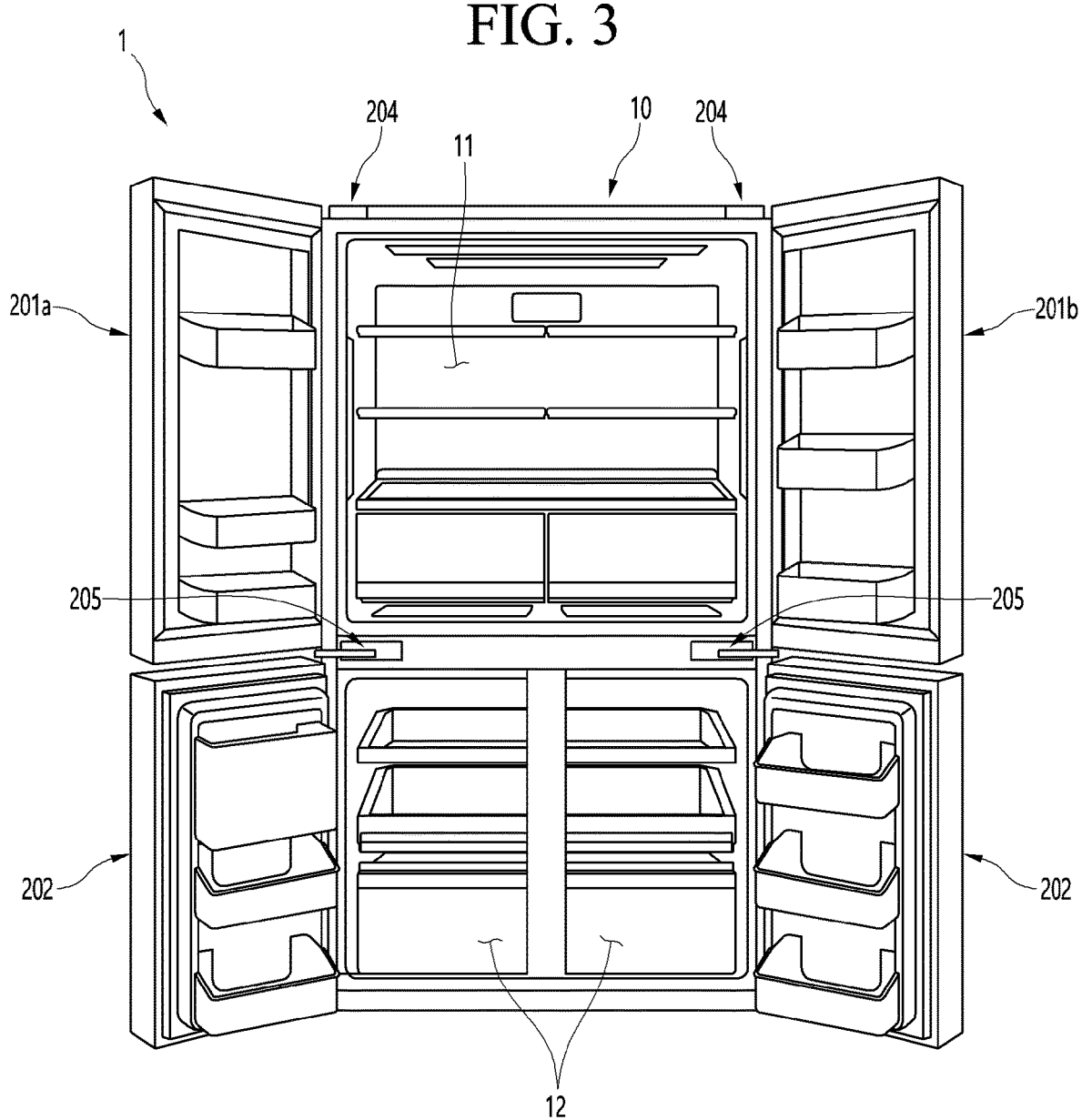
FIG. 3 is a front view illustrating a state in which a door of the refrigerator is opened.

FIG. 1 is a front view illustrating a state in which refrigerators are installed according to an embodiment. FIG. 2 is a front view of a refrigerator according to an embodiment. FIG. 3 is a front view illustrating a state in which a door of the refrigerator is opened.

As illustrated in the drawings, refrigerators 1 and 1' according to an embodiment may be disposed in a kitchen or an indoor space and may be installed in harmony with surrounding furniture 2 or a wall surface. In addition, the plurality of refrigerators 1 and 1' may be arranged side by side with each other. Here, the plurality of refrigerators 1 and 1' may be refrigerators having different shapes.

For example, the first refrigerator 1 of the plurality of refrigerators may have a structure in which a storage space is partitioned vertically and is opened and closed by an upper door 201 and a lower door 202. The upper door 201 and the lower door 202 may open and close the storage space by their rotation. In addition, the upper door 201 and the lower door 202 may be configured as a pair of doors at left and right sides, respectively.

In the plurality of refrigerators, the second refrigerator 1' may be disposed at a side of the first refrigerator 1. That is, the first refrigerator 1 and the second refrigerator 1' may be continuously arranged side by side. The storage space of the second refrigerator 1 may be partitioned vertically. In addition, the storage space may be opened and closed by an upper door 201' and a lower door 202'. Here, the upper door 201' may open and close the storage space by rotation thereof. In addition, the lower door 202' may be inserted and withdrawn in a drawer type to open and close the storage space. The lower door 202' may be provided in plurality, which are disposed vertically.

Although shapes and configurations of the doors of the first refrigerator 1 and the second refrigerator 1' are different, front exteriors of the refrigerators may be defined by the doors. In addition, each of front exteriors of the doors 20 and 20' may be provided in a color that harmonizes with adjacent furniture 2 or a wall surface.

In addition, colors of the doors 20 and 20' may be output by operations of lighting devices 36 and 36' to be described below and be changed according to the operations of the lighting devices 36 and 36'. That is, the doors 20 and 20' may be output in a color desired by the user according to user's setting, to display exterior colors of the refrigerators 1 and 1'.

The embodiment of the present disclosure is not limited to the refrigerator having the above-described door arrangement and may be applied to various refrigerators and home appliances provided with doors.

Hereinafter, a refrigerator according to an embodiment will be described in more detail based on the first refrigerator 1. The case of the second refrigerator 1' has the same structure, in which an exterior color of the door is displayed and changed, as the first refrigerator 1, except for an arrangement and shape of the door, and thus, detailed descriptions thereof will be omitted.

As illustrated in FIGS. 2 and 3, the refrigerator 1 may include a cabinet 10 defining a storage space and a door 20 opening and closing the storage space of the cabinet 10. For example, the cabinet 10 may define the storage space partitioned vertically. Here, an upper storage space 11 may be defined at an upper portion of the cabinet 10, and a lower storage space 12 may be defined at a lower portion of the cabinet 10.

The door 20 may include the upper door 201 and the lower door 202, and the door 20 may be connected to the cabinet 10 by hinge devices 204 and 205 and be rotatably mounted. In addition, the upper door 201 may include a first upper door 201a and a second upper door 201b, which are disposed at both left and right sides. The lower door 202 may also be provided as a pair of doors disposed at both left and right sides.

The door 20 may define a front exterior of the refrigerator 1 in a state in which the door 20 is closed. A front exterior of the second refrigerator 1' may also be defined by the door 20' with only a difference in an arrangement and size of the door 20'.

Hereinafter, structures of the doors 20 and 20' will be described in detail with reference to drawings. The structures of the doors 20 and 20' may be equally applied to the doors 20 and 20' of the first refrigerator 1 and the second refrigerator 1'.

Figure 4:
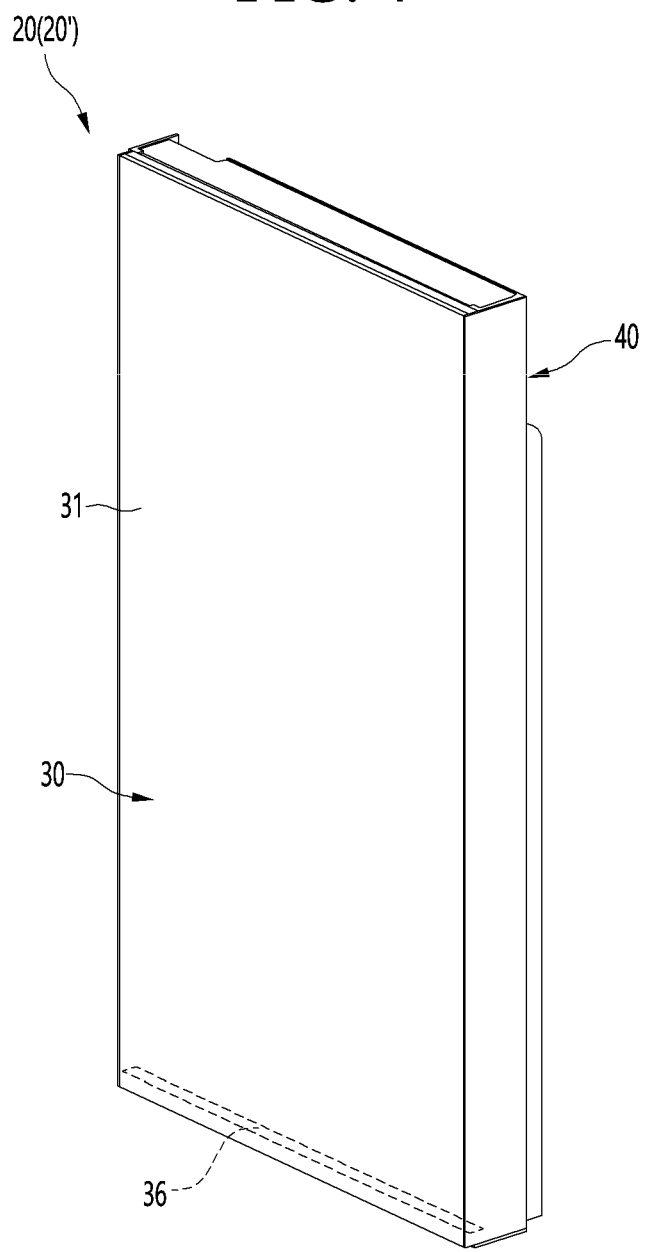
FIG. 4 is a perspective view of the door.

FIG. 4 is a perspective view of the door.

As illustrated in the drawings, the door 20 may include a door body 21 defining the overall shape of the door 20 and configured to open and close the storage space and a panel assembly 30 defining an exterior of a front surface of the door 20. The door 20 may be configured so that the panel assembly 30 is disposed on a front surface of the door body 40.

The panel assembly 30 may include a panel 31 through which light is transmitted. A front surface of the door 20 may be formed by the panel 31. In addition, the door 20 may further include a lighting device 36.

The lighting device 36 may be provided inside the door 20 and may have various shapes for emitting light toward the panel 31. In addition, the lighting device 36 may be configured to emit light having various colors. Thus, a set color may be output on the front surface of the door 20 by driving the lighting device 36, and a color of the front exterior of the refrigerator 1 may be determined.

The panel assembly 30 may be detachably provided to the door 30 in the form of a module in which a plurality of components are assembled. Hereinafter, a structure of the panel assembly 30 will be described with reference to drawings.

Figure 5:
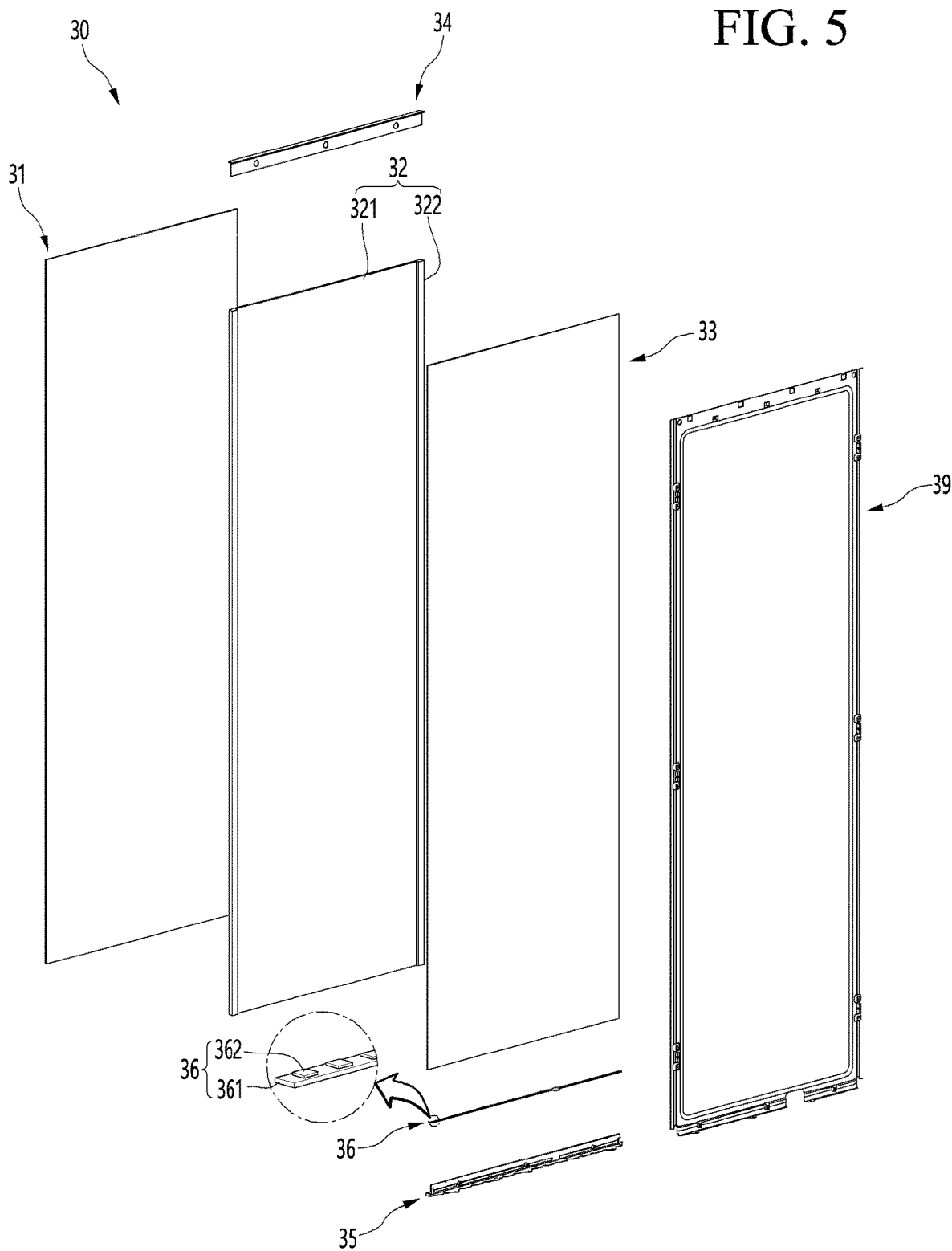
FIG. 5 is an exploded perspective view illustrating an example of a panel assembly that is one component of the door.

In addition, FIG. 5 is an exploded perspective view illustrating an example of the panel assembly that is one component of the door.

The inside of the door body 40 may be filled with an insulating material, and the panel assembly 30 may be mounted on the front surface of the door body 40.

The panel assembly 30 may define the front exterior of the door 20 in a state of being mounted on the front surface of the door body 40. The panel assembly 30 may be detachably mounted to the door body 40 in an assembled state.

The panel assembly 30 may include a panel 31 defining an exterior of a front surface thereof, a lighting device 36 emitting light to the panel 31, and a back cover 39 defining a rear surface of the panel assembly 30.

The panel assembly 30 may further include a light guide plate 33 guiding the light of the lighting device 36 to the panel 31. In addition, the panel assembly 30 may further include a mounting member 32 that mounts the light guide plate 33 and the panel 31.

In addition, the panel assembly 30 may include an upper bracket 34 forming a top surface of the panel assembly 30 and a lower bracket 35 forming a bottom surface of the panel assembly 30. The lighting device 36 may be mounted on the lower bracket 35.

In more detail, the panel 31 may be provided in a rectangular plate shape and may be made of a material capable of transmitting light therethrough. In addition, the panel 31 may be provided to transmit light and have a color. Thus, the panel may provide a basic color of the front surface of the door 20 even when the lighting device 36 is turned off. For example, a color layer may be disposed on the panel 31. In addition, the color layer may be provided to have a pattern or texture having a pattern. In an embodiment, the basic color may be defined as a color of the front surface of each of the doors 20 and 20' when the lighting device 36 is turned off.

The light guide plate 33 may be disposed at a rear side spaced apart from the panel 31. In addition, the light guide plate 33 may be configured to guide the light radiated from the lighting device 36 disposed below the light guide plate 33 toward the panel 31. A reflective layer that reflects the light forward may be provided on a rear surface of the light guide plate 33.

The mounting member 32 may be configured so that the light guide plate 33 and the panel 31 are fixedly mounted thereon. The mounting member 32 may include a front part 321, on which the panel 31 is mounted, and a side part 322 protruding backward from each of both left and right ends of the front part 321.

Both ends of the light guide plate 33 may be inserted and fixed to the side parts 322 disposed at both the left and right sides, respectively. In addition, the upper bracket 34 and the lower bracket 35 may be inserted and fixed to upper and lower ends of the side part 322, respectively. In addition, both left and right ends of the back cover 39 may be supported by the side part 322.

The mounting member 32 may not be limited to such a structure, but may have a variety of different structures that are capable of being coupled to at least one of the panel 31, the light guide plate 33, the upper bracket 34, the lower bracket 35, or the back cover 39.

In addition, the panel assembly 30 may be provided by coupling the panel 31, the light guide plate 33, the upper bracket 34, the lower bracket 35, and the back cover 39 without the mounting member 32.

The lighting device 36 may be provided inside the lower bracket 35. The lighting device 36 may be disposed below the light guide plate 33 to extend along a lower end of the light guide plate 33.

The lighting device 36 may include a substrate 361 and a light source 362. The substrate 361 may extend along the lower bracket 35. In addition, a plurality of the light sources 362 may be continuously arranged at regular intervals along the substrate 361 and may radiate light toward a lower end of the light guide plate 33. For example, the light source 362 may be provided as an RGB LED. Thus, the lighting device 36 may emit light having a set color, and the front surface of the door 20 may be illuminated in various colors.

In the embodiment, although the lighting device 36 is provided on a lower end of the door 20, that is, the lower bracket 35 as an example, the lighting device 36 may be disposed inside the door 20 to emit the light to an end of the light guide plate 33.

A light supporter 37 may be provided under the substrate 361. The light supporter 37 may support the lighting device 36 so that the lighting device 36 is fixedly mounted inside the lower bracket 35. In addition, the light supporter 37 may be configured to be in contact with the lighting device 36 and the back cover 39 so as to dissipate heat from the lighting device 36 through the back cover 39.

The back cover 39 may be provided in the form of a plate made of a metal material and may define the rear surface of the panel assembly 30. The back cover 39 may be coupled to the upper bracket 34 and the lower bracket 34 to complete an overall assembly of the panel assembly 30.

Figure 6:
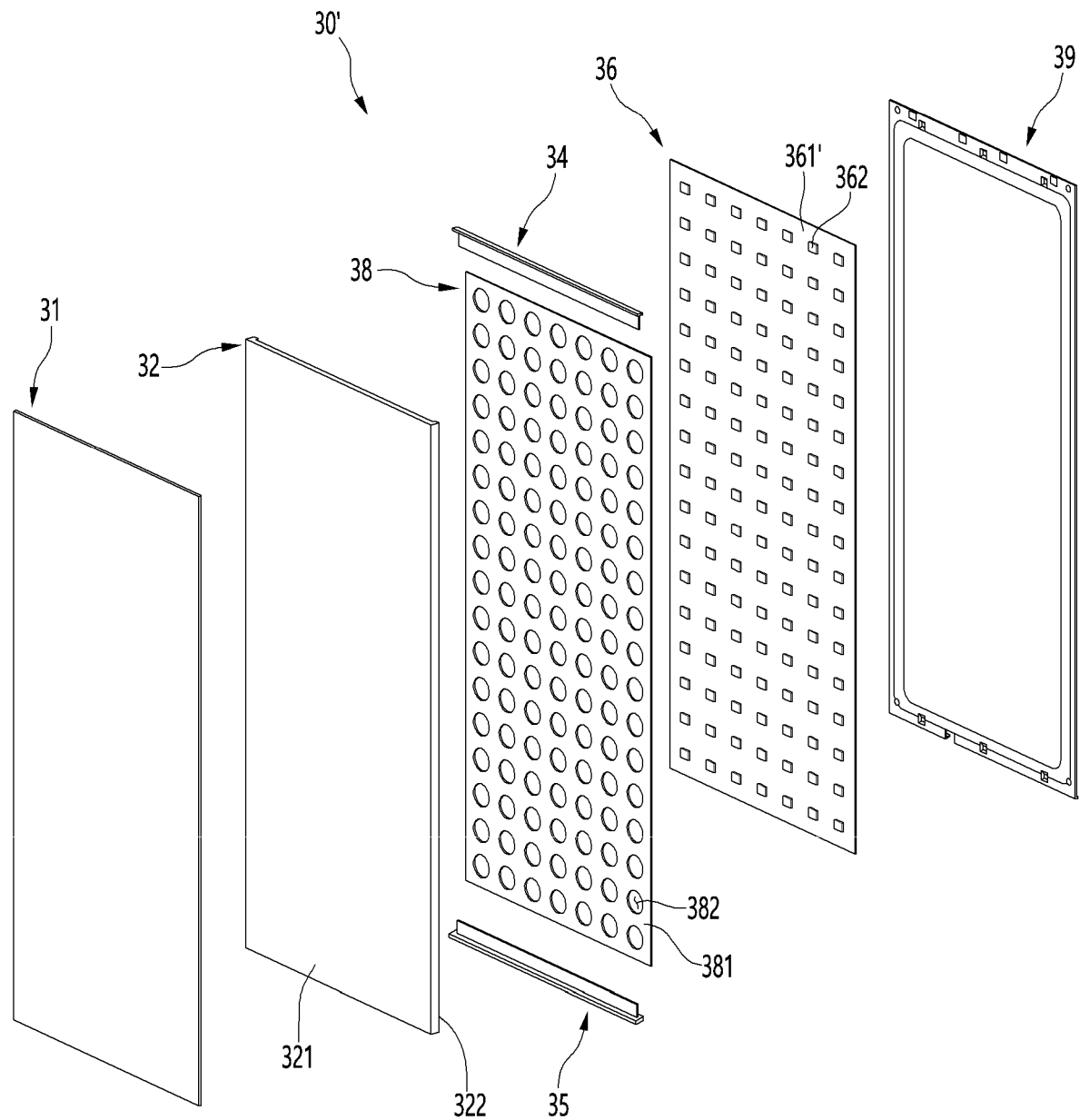
FIG. 6 is an exploded perspective view illustrating another example of the panel assembly.

FIG. 6 is an exploded perspective view illustrating another example of the panel assembly.

As illustrated in the drawing, the panel assembly 30 may include a panel 31 defining an exterior of a front surface thereof, a lighting device 36 emitting light to the panel 31, and a back cover 39 defining an exterior of a rear surface of the panel assembly 30.

In addition, the panel assembly 30 may further include a mounting member 32 that mounts the light guide plate 31 and the panel 36. In addition, the panel assembly 30 may further include a spacer 38 provided between the mounting member 32 and the lighting device 36.

The panel assembly 30 may include an upper bracket 34 forming a top surface of the panel assembly 30 and a lower bracket 35 forming a bottom surface of the panel assembly 30.

Structures of the panel 31, the mounting member 32, the upper bracket 34, the lower bracket 35, and the back cover 39, which constitute the panel assembly 30', are the same as those of the foregoing embodiment, and thus, detailed descriptions thereof will be omitted.

The lighting device 36 may include a plate-shaped substrate 361' and a plurality of LEDs 362 disposed on a front surface of the substrate 361'. The substrate 361' may be provided in various shapes in which the plurality of LEDs 362 are mounted horizontally and vertically. For example, the substrate 361 may be provided in a rectangular plate shape and may be provided in a size capable of being inserted into the mounting member 32. Alternatively, the substrate 361' may be divided into a plurality of pieces, and the divided substrates may be assembled to constitute the entire lighting device 36.

Both left and right ends of the substrate 361' may be fixedly mounted to the side part 322 of the mounting member 32. Although the size of the substrate 361' is less than that of the panel 31, a surface on which the plurality of LEDs 362 are disposed at regular intervals may be provided to illuminate the entire panel 31.

The LED 362 may be constituted by red, green, and blue light emitting diodes (RGB LEDs) to emit light having various colors. A plurality of the LEDs 362 may be spaced set intervals from each other.

A spacer 38 may be provided in front of the lighting device 36. The door 20 to which the panel assembly 30 is mounted may have a use environment in which the door is repeatedly opened and closed, and when the door 20 is repeatedly opened and closed, the spacer 38 may prevent an impact from being directly applied to the LEDs 362. In addition, the LED 362 may be maintained at a set distance from the panel 31 or the mounting member 32 by the spacer 38. Thus, when the lighting device 36 is driven, brightness of the panel 31 may be maintained uniformly, and a spot phenomenon in which the LED 362 is locally brightly shined at a position at which the LED 362 is disposed may be prevented from occurring.

The spacer 38 may be provided in a plate shape corresponding to a size of the lighting device 36. A front surface of the spacer 38 may be in contact with the front part 321 of the mounting member 32, and a rear surface of the spacer 38 may be in contact with the substrate 361'.

The spacer 38 may include a spacer body 331 provided in a plate shape and a plurality of through-holes 332 passing through the spacer body 331. The number of through-holes 332 corresponding to positions corresponding to those of the LEDs 362 may be provided. In addition, the LED 362 may be provided to be accommodated in the through-hole 332.

The spacer 38 may be made of a material capable of transmitting light or may be made of a transparent or translucent material. In addition, the spacer 38 may include an additive material such as a diffusion agent for diffusing the light emitted from the LED 362.

The spacer 38 may be mounted on the mounting member 32 while being seated on the substrate 361'. That is, the spacer 38 and the lighting device 36 may be inserted into and fixed to the side part 322 of the mounting member 32 in the state of being coupled to each other.

In the state in which the spacer 38 and the lighting device 36 are mounted on the mounting member 32, the back cover 39 may be coupled. The back cover 39 may shield the entire rear surface of the lighting device 36 to define the rear surface of the panel assembly 30.

In the refrigerators 1 and 1' having the above structures, the lighting device 36 may operate by user's manipulation, and the colors of the front surfaces of the doors 20 and 20' may be changed.

Hereinafter, the structure of the refrigerators 1 and 1' will be described in more detail with reference to the drawings.

Figure 7:
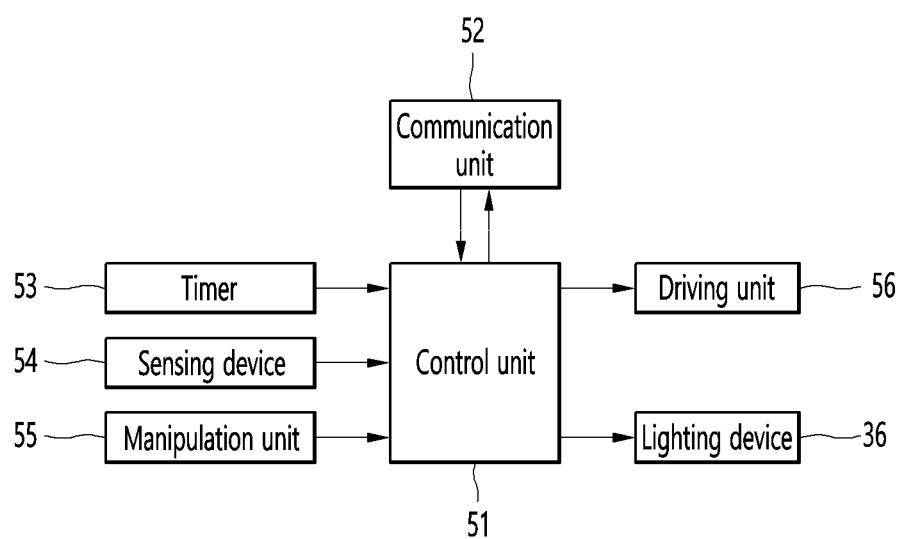
FIG. 7 is a block diagram illustrating a flow of a control signal of the refrigerator.
Figure 8:
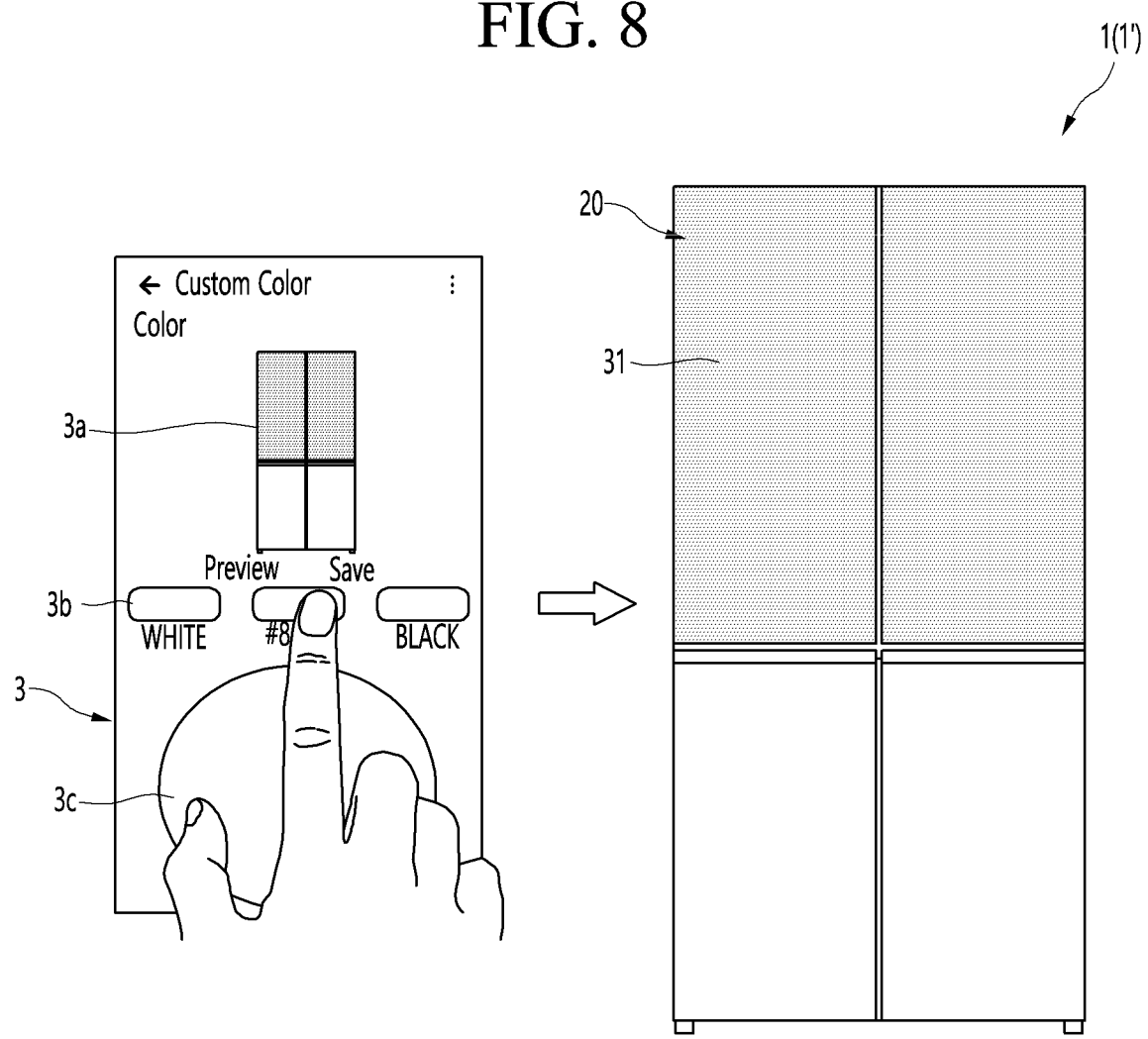
FIG. 8 is a view illustrating manipulation of a mobile device for changing a color of the door.
Figure 9:
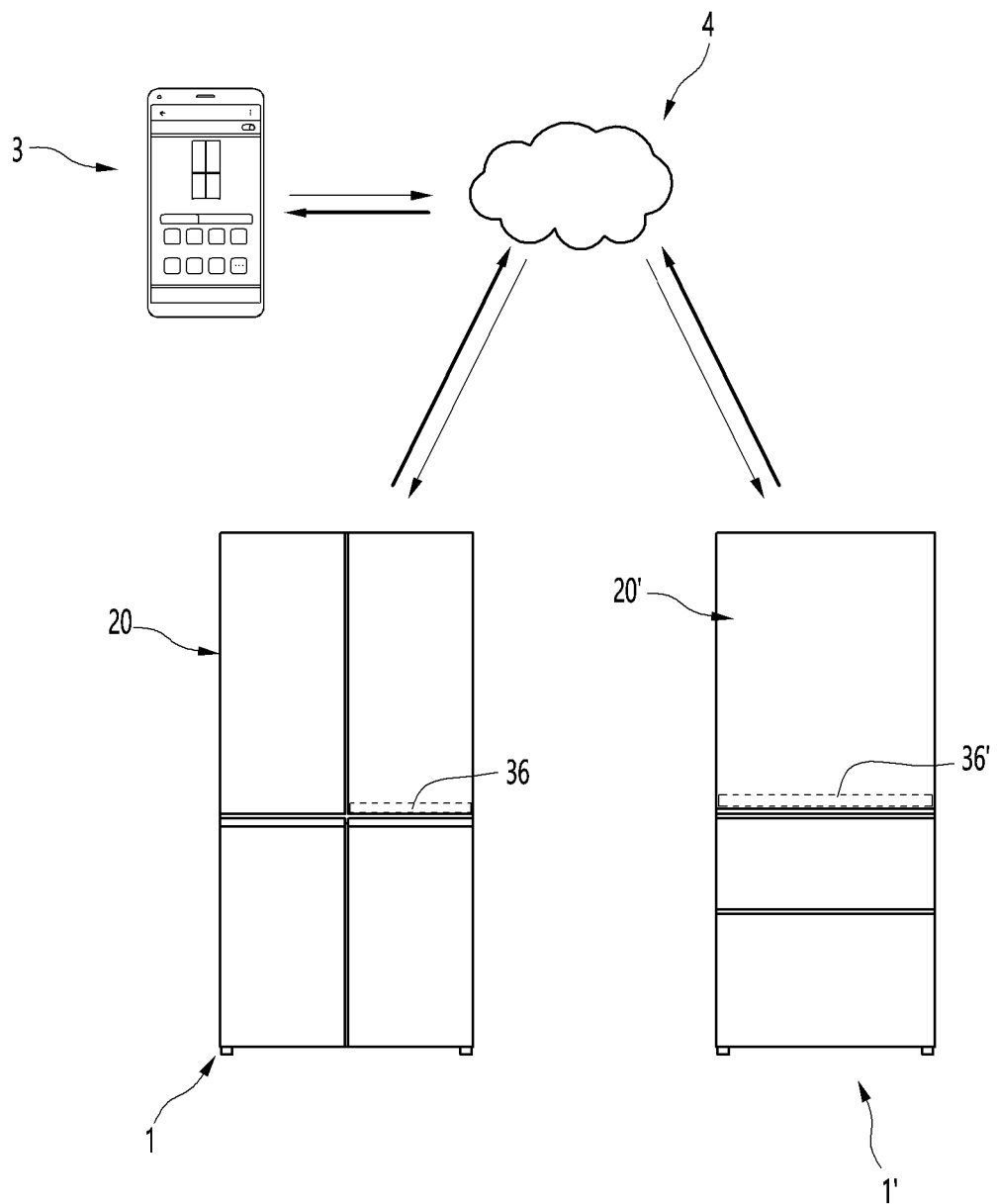
FIG. 9 is a view illustrating a connection relationship between the refrigerators, a server, and the mobile device.

FIG. 7 is a block diagram illustrating a flow of a control signal of the refrigerator. FIG. 8 is a view illustrating manipulation of a mobile device for changing a color of the door. FIG. 9 is a view illustrating a connection relationship between the refrigerators, the server, and the mobile device.

As illustrated in the drawings, each of the refrigerators 1 and 1' may include a control unit 51. The control unit 51 may control an operation of a driving unit 56. The driving unit 56 may include components for a cooling operation of the refrigerators 1 and 1'. For example, the driving unit 56 may be a component of a refrigeration cycle and may include a compressor.

In addition, the control unit 51 may control operations of the lighting devices 36 and 36'. The lighting devices 36 and 36' may be turned on and off by an operation of the control unit 51. In addition, the lighting devices 36 and 36' may emit light having a specific color according to a signal transmitted from the control unit 51. In FIG. 9, the lighting devices 36 and 36' are illustrated only on some doors 20 and 20', but the lighting devices 36 and 36' may be provided on all of the doors 20 and 20' to express colors of all of the doors 20 and 20'.

Each of the refrigerators 1 and 1' may include a communication unit 52. The communication unit 52 may be connected to the control unit 51 to communicate with a server 4 and a user's mobile device 3 disposed at a remote location. Thus, the server 4 may receive information about the refrigerators 1 and 1' to transmit operation signals of the refrigerators 1 and 1' to the respective refrigerators 1 and 1'. In addition, the mobile device 3 may input the information of the refrigerators 1 and 1' to the server 4 to transmit the information of the refrigerators 1 and 1' to the server 4.

The mobile device 3 may be a variety of devices that is carried and manipulated by the user, and for example, a mobile phone, a tablet PC, a remote controller, a wearable device, and the like may be used. Also, the refrigerators 1 and 1', the mobile device 3, and the server 4 may be connected in a state in which wireless communication is possible. For example, the refrigerators 1 and 1', the mobile device 3, and the server 4 may be connected in a mutually communicable state through Wi-Fi, Bluetooth, Zigbee, or the like.

Each of the refrigerators 1 and 1' may include a timer 53. The timer 53 may be integrated with the control unit 51 or other components. The timer 53 may be connected to the control unit 51 to count a time required to control the operation of the refrigerators 1 and 1'. For example, the timer 53 may count operation times of the lighting devices 36 and 36' or the LEDs 362 and 362' constituting the lighting devices 36 and 36', and may count a time for determining an on/off timing of the LEDs 362 and 362'.

Each of the refrigerators 1 and 1' may include a sensing device 54. The sensing device 54 may be connected to the control unit 51 and may be provided as a device for sensing information input for controlling the operations of the refrigerators 1 and 1'. The sensing device 54 may be a proximity sensing device 54 or an illuminance sensing device 54. For example, the lighting devices 36 and 36' may be turned on or off or be changed in color of the emitted light according to whether or not to be sensed by the proximity sensing device 54. As another example, brightness or on/off of the lighting devices 36 and 36' may be adjusted according to whether or not to be sensed by the illuminance sensor 54.

Each of the refrigerators 1 and 1' may further include a manipulation unit 55. The manipulation unit 55 may be connected to the control unit 51 and may be configured to be manipulated by a user so as to control the operations of the refrigerators 1 and 1'. For example, the manipulation unit 55 may be provided at one side of the cabinet 10 or the doors 20 and 20', and may turn the lighting devices 36 and 36' on and off by the user's manipulation. That is, the user may set the lighting devices 36 and 36' in a non-operable state or may manipulate the lighting devices 36 and 36' in an operable state through the manipulation unit 55. In addition, the colors of the refrigerators 1 and 1' on which the control unit is disposed may be directly input through the manipulation unit 55.

The plurality of the refrigerators 1 and 1' may be installed side by side. All of the plurality of refrigerators 1 and 1' may be connected to the server 4, and when an output state of the door 20 or 20' of one refrigerator 1 or 1' is selected through the manipulation of the mobile device 3, an output state of the door 20 or 20' of the other refrigerator 1' or 1 may be synchronized and output by the server 4.

For example, as illustrated in FIG. 9, when the first refrigerator 1 and the second refrigerator 1' are installed, all of the first refrigerator 1 and the second refrigerator 1' may be recognized by the server 4. In addition, the user may manipulate the mobile device 3 to input the output states of the doors 20 and 20' of the first refrigerator 1 and the second refrigerator 1'.

That is, the user may input a color of the first refrigerator door 20 using the mobile device 3, and the first lighting device 36 may operate according to the input color. The user may input a color of the first refrigerator door 20 by manipulating the manipulation unit 55, and the first lighting device 36 may operate according to the input color.

In addition, the server 4 may allow the operation of the second lighting device 36' of the second refrigerator door 20' to match based on the information of the refrigerators 1 and 1' stored in the server 4. Thus, the first refrigerator door 20 and the second refrigerator door 20' may have the same output color. In the embodiment, the output color means a color seen through the front surface of the door. In addition, the meaning of the same output color means the same degree to which a general user visually feels the same and does not mean exactly the same degree when the color is numerically converted.

The mobile device 3 may include a refrigerator selection unit 3a and a color selection unit. The refrigerator selection unit 3a and the color selection unit may be displayed on a screen of the mobile device 3, and the user may perform a desired input by touch manipulation.

The refrigerator selection unit 3a may indicate the recognized refrigerators 1 and 1'. In addition, the refrigerator selection unit 3a may select the refrigerators 1 and 1' for changing the output colors of the doors 20 and 20'. In addition, all of the doors 20 and 20' of the refrigerators 1 and 1' may be displayed on the refrigerator selection unit 3a, and the user may select and input the door 20 and 20' of which colors are desired to be changed.

The color selection unit may input the color of the door selected by the refrigerator selection unit 3a. For example, the color selection unit may include a first color selection unit 3b and a second color selection unit 3c.

The first color selection unit 3b may indicate a representative color that is mainly used or a color previously selected by the user and may allow the user to manipulate and input the color. The first color selection unit 3b may display a plurality of colors, but may have fewer selection options than the second color selection unit 3c.

The second color selection unit 3c may be configured to display all RGB colors that are capable of being expressed through the lighting devices 36 and 36'. For example, the second color selection unit 3c may be provided as a circular color picker or color palette and may adjust and select fine colors through the second color selection unit 3c.

Therefore, when the user intends to select representative colors or colors that are frequently used, the user may input the colors through the first color selection unit 3b, and when the user intends to select colors that require fine adjustment or colors that need color matching with the surroundings, the user may input the colors through the second color selection unit 3c. The output color of the doors 20 and 20' may be individually selected and simultaneously input colors for each of the plurality of door 20 and 20'.

For example, in an embodiment, when the plurality of refrigerators 1 and 1' are disposed, the output color of the first refrigerator door 20 may be selected to be synchronized so that the color of the second refrigerator door 20' is the same.

Figure 10:
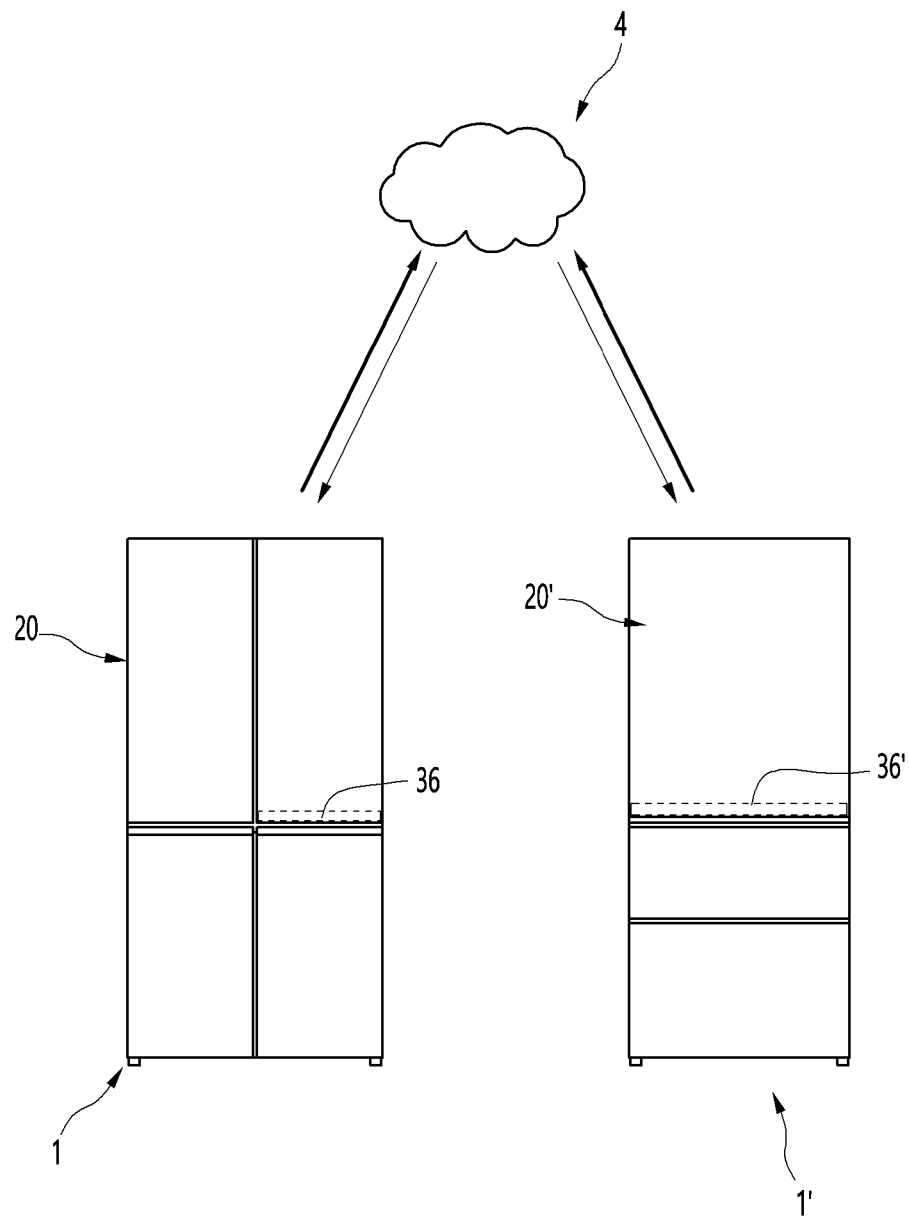
FIG. 10 is a view illustrating a connection relationship between the refrigerators and the server.

FIG. 10 is a view illustrating a connection relationship between the refrigerators and the server.

As illustrated in the figure, the colors of the refrigerators 1 and 1' may be directly input through one refrigerator 1.

In detail, in the state in which the first refrigerator 1 and the second refrigerator 1' are installed, the first refrigerator 1 and the second refrigerator 1' may be in a state of being recognized by the server 4. In addition, the user may input the color of the first refrigerator door 20 by manipulating the manipulation unit 55.

For example, the colors may be input as letters, numbers, or codes by manipulating the manipulation unit 55. The manipulation unit 55 may be configured to enable a voice input and may allow a color input through voice. In addition, the input color of the first refrigerator door 20 may be transmitted to the server 4. In addition, the server 4 may determine information of the recognized refrigerators 1 and 1' so that the second refrigerator door is output in the same color.

The refrigerator 1 of which a color is input by the user may be referred to as a reference refrigerator, and the refrigerator 1' of which a color is automatically changed based on the information of the server 4 may be referred to as a subordinate refrigerator. Further, in the embodiments, the reference refrigerator may be described as the first refrigerator 1, and the subordinate refrigerator may be described as the second refrigerator 1', but the reference refrigerator may be described as the second refrigerator 1', and the subordinate refrigerator may be described as the first refrigerator 1.

Hereinafter, a process of synchronizing the colors output from the plurality of refrigerators 1 and 1' will be described in detail with reference to the drawings.

Figure 11:
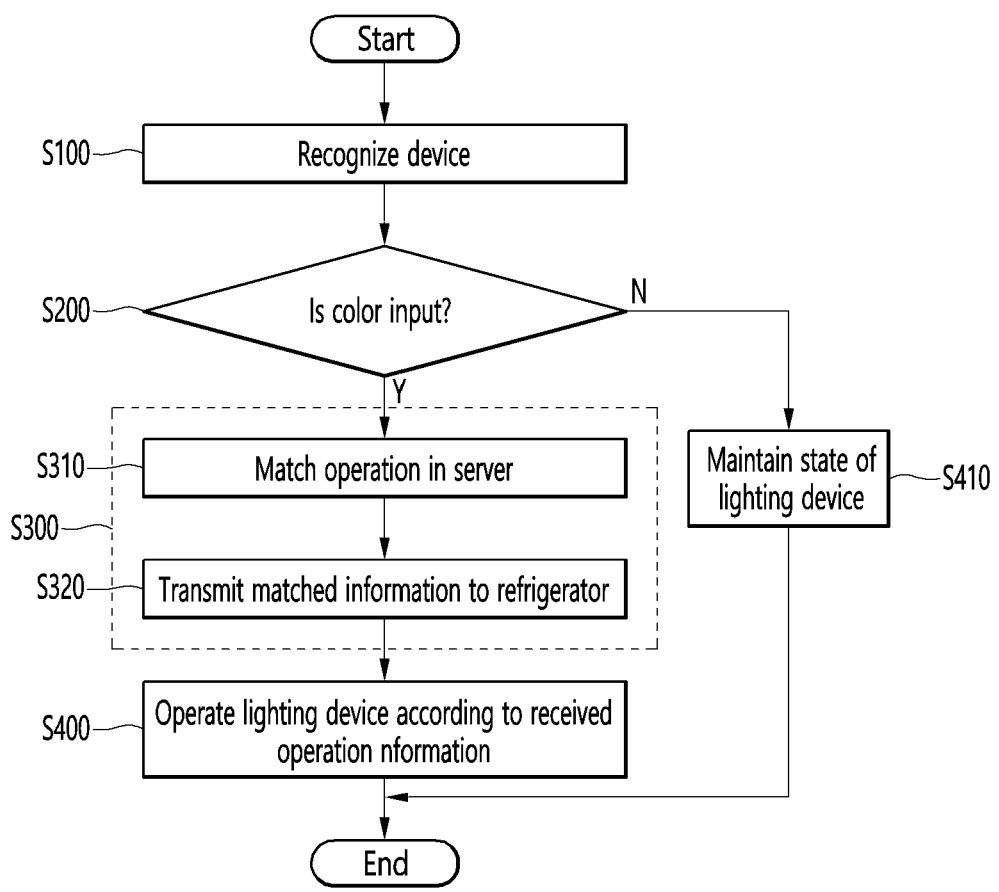
FIG. 11 is a flowchart sequentially illustrating an operation for changing colors of doors of the refrigerators.
Figure 12:
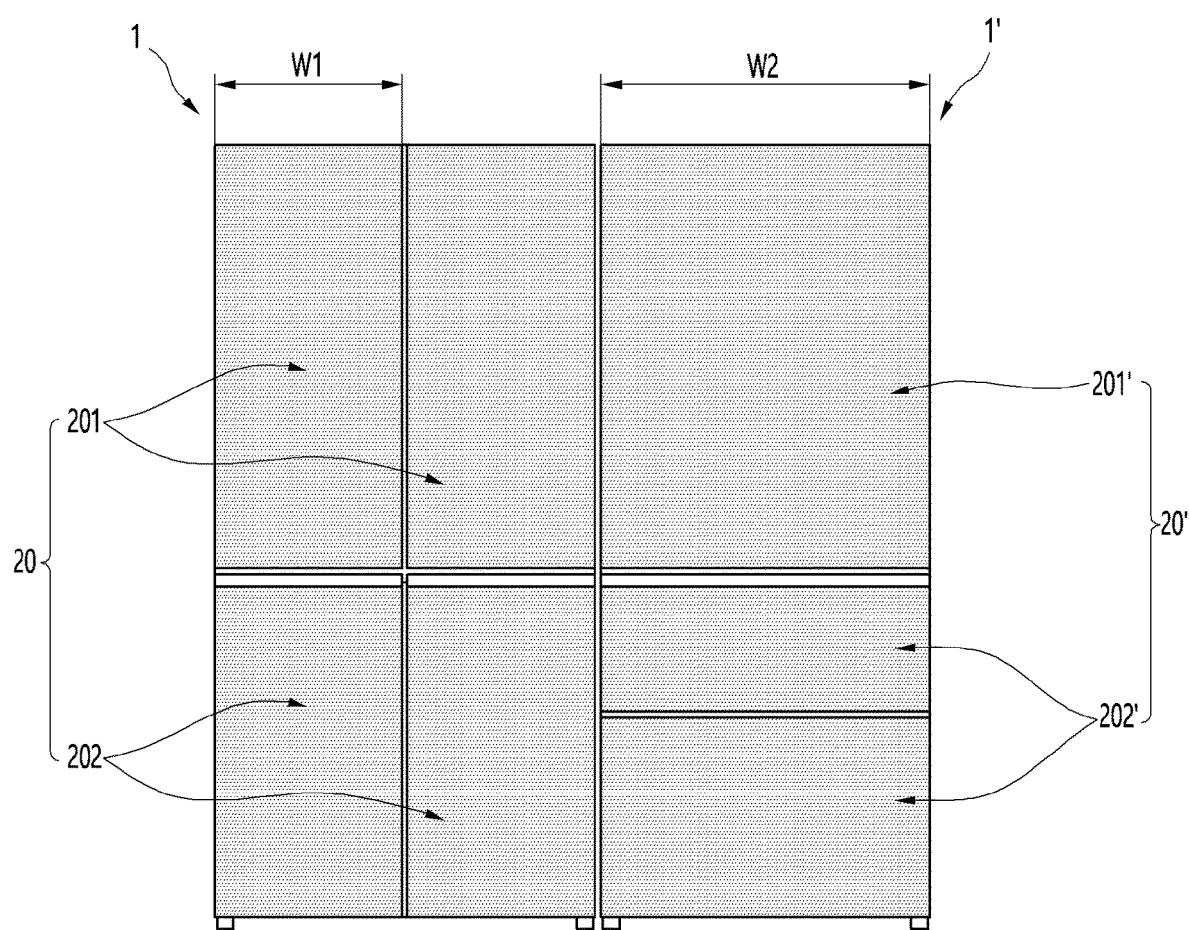
FIG. 12 is a view illustrating a state in which front colors of the refrigerators are synchronized.

FIG. 11 is a flowchart sequentially illustrating an operation for changing colors of the doors of the refrigerators. FIG. 12 is a view illustrating a state in which front colors of the refrigerators are synchronized.

As illustrated in drawing, the first refrigerator 1 and the second refrigerator 1' may be disposed side by side. Here, the first refrigerator 1 and the second refrigerator 1' may have different specifications (size, basic color, lighting device structure) of the doors 20 and 20'.

For example, the first refrigerator 1 may include a pair of upper doors 201 and a pair of lower doors 202. In addition, in the second refrigerator 1', the upper door 201' may be configured as one door, and the lower door 202' may be configured so that two doors are disposed vertically.

In addition, a horizontal length of the first refrigerator door 20 may be less than that of the second refrigerator door 20'. Thus, the first lighting device 36 of the first refrigerator 1 may have a length less than that of the second lighting device 36' of the second refrigerator 1'.

As a result, when the first lighting device 36 and the second lighting device 36' operate in the same setting, there is a slight difference in output color between the first refrigerator door 20 and the second refrigerator door 20'. That is, due to the difference in size of the doors 20 and 20', there may be a difference in intensity of light transmitted to the doors 20 and 20', and also, there may be a difference in brightness of the lighting devices 36 and 36' themselves.

When the lighting devices 36 and 36' operate in the same setting due to the difference in the number of LEDs 362 and 362' and the difference in size of the doors 20 and 20', the doors 20 and 20' may inevitably causes a difference in output color.

In order for the output colors of the doors 20 and 20' to be the same, the first lighting device 36 and the second lighting device 36' have to match each other so as to perform different operations. Since operation matching between the lighting devices 36 and 36' varies according to the sizes and the selected colors of the doors 20 and 20', it may be difficult for the user to directly match and input the operation matching.

Therefore, the server 4 may recognizes the plurality of refrigerators 1 and 1' to stores related information, and the operations of the lighting devices 36 and 36' may match each other so that the front surfaces of the plurality of refrigerators 1 and 1' have the same color and then be respectively transmitted to the refrigerators 1 and 1'.

Looking at this in detail with reference to FIGS. 11 and 12, the first refrigerator 1 and the second refrigerator 1' may be installed side by side with respect to each other and may be recognized by the server 4. The first refrigerator 1 and the second refrigerator 1' may be automatically connected to the server 4 without separate setting. In addition, the user may allow the server 4 to recognize the first refrigerator 1 and the second refrigerator 1' by manipulating the manipulation unit 55 or the mobile device 3.

In the state in which the first refrigerator 1 and the second refrigerator 1' are recognized by the server 4, information that has an influence on the color to be output through the doors 20 and 20' such as the sizes and the basic colors of the first refrigerator door 20 and the second refrigerator door 20', the number of LEDs 362 and 362' of the lighting devices 36 and 36', and the like may be stored in the server 4.

In addition, in the state in which the first refrigerator 1 and the second refrigerator 1' are recognized by the server 4, the recognized information may be displayed on the mobile device 3. That is, the user may check the status and information of the first refrigerator 1 and the second refrigerator 1' through the mobile device 3. [S100]

In this state, if the lighting devices 36 and 36' are turned off, the front surfaces of the doors 20 and 20' may be seen in the basic color of the panel 31. In addition, the basic colors of the first refrigerator door 20 and the second refrigerator door 20' may be different colors. In addition, when the lighting devices 36 and 36' are turned on, the front surfaces of the first refrigerator door 20 and the second refrigerator door 20' may have set output colors.

The user may select and input any one color while the server 4 recognizes the first refrigerator 1 and the second refrigerator 1'. For example, the user may select and input the output color of the first refrigerator door 20 using the mobile device 3. [S200]

When the output color of the first refrigerator door 20 is selected, the selection information may be transmitted to the server 4, and the server 4 may determine the operation setting of the first lighting device 36.

Simultaneously, the server 4 may match the operation of the second lighting device 36'. In detail, the server 4 may match the operation of the second lighting device 36' so that the output color of the second refrigerator door 20' is the same as the input output color of the first refrigerator door 20 based on the recognized information of the first refrigerator 1 and the second refrigerator 1'.

For example, as illustrated in FIG. 12, the first refrigerator door 20 may have a size less than that of the second refrigerator door 20'. A horizontal width W1 of the first refrigerator door 20 may be less than a horizontal width W2 of the second refrigerator door 20'.

In this state, when the first lighting device 36 and the second lighting device 36' operate with the same settings, the colors output to the first refrigerator door 20 and the second refrigerator door 20' may differ from each other.

Therefore, the second lighting device 36' may match the color with an operation setting compensated for according to the size so that the second refrigerator door 20' appears to be the same color as the first refrigerator door 20. Therefore, even if the first refrigerator door 20 and the second refrigerator door 20' have different sizes, the output colors of the doors 20 and 20' may be the same.

In addition, the information matched for sizes or colors of the doors 20 and 20' may be already stored in the server 4 or may be calculated by the server 4. That is, when the output color of the first refrigerator door 20 is input, the server 4 may match a corresponding operation among the previously stored operations of the second lighting device 36'. In addition, when the output color of the first refrigerator door 20 is input, the server 4 may match the operation of the second lighting device 36' by applying a compensation value calculated based on the stored information. [S310]

The server 4 may transmit the operation information of the first lighting device 36 and the operation information of the automatically matched second lighting device 36' to the first refrigerators 1 and 2, based on the input colors.

That is, the operation setting of the first lighting device 36 corresponding to the output color input by the user may be transmitted to the first refrigerator 1. In addition, the operation settings matched by the server 4 may be transmitted to the second refrigerator 1' so that the second refrigerator door 20' has the same output color as the first refrigerator door 20.

Therefore, although the first refrigerator door 20 and the second refrigerator door 20' output the same color, the operation information of the lighting devices 36 and 36', which are transmitted from the server 4 to the first refrigerator 1 and the second refrigerator 1' may be different from each other. [S320/S300]

The operation information received from the communication unit 52 of each of the first refrigerator 1 and the second refrigerator 1' may be transmitted to the control unit 51, and the control unit 51 may control the first lighting device 36 and the second lighting device 36' according to the received operation information.

As a result, the first refrigerator door 20 and the second refrigerator door 20' have the same output color due to the different operations of the first lighting device 36 and the second lighting device 36'.

Thus, even when the sizes of the doors 20 and 20' are different, the first refrigerator 1 and the second refrigerator 1' disposed side by side have the same front exterior color to provide a sense of unity. [S400]

In operation S200, when the color of the first refrigerator 1 is not input, the lighting devices 36 and 36' may be maintained in the previous operating state. That is, the lighting devices 36 and 36' operate to be maintained in the previous on/off state or color. [S410]

In addition, even when the basic colors of the first refrigerator door 20 and the second refrigerator door 20' are different, the server 4 may compensate the operation of the second lighting device 36' in the same manner as the above-described control method so that the output colors of the first refrigerator door 20 and the second refrigerator door 20' appear to be the same.

That is, when the output color of the first refrigerator door 20 is input, the server 4 may match the operation of the second lighting device 20' in consideration of the basic color information of the refrigerators 20 and 20' so as to be transmitted to the second refrigerator 20'.

In addition, even when the first lighting device 36 and the second lighting device 36' have different structures, the server 4 may compensate the operation of the second lighting device 36' in the same manner as the above-described control method so that the output colors of the first refrigerator door 20 and the second refrigerator door 20' appear to be the same.

That is, when the output color of the first refrigerator door 20 is input, the server 4 may match the operation of the second lighting device 20' of the second refrigerator door 20 in consideration of the information of the structure of the first lighting device 36 and the structure of the second lighting device 36' so as to be transmitted to the second refrigerator 20'.

Here, the structures of the lighting devices 36 and 36' may be the number of LEDs, the output of the LEDs, the type of the LEDs, and the arrangement of the LEDs.

Alternatively, the server 4 may match the operation of the lighting devices 36 and 36 in consideration of the sizes, the basic colors, and the structures of the lighting devices 36 and 36.

The lighting devices 36 and 36' of the refrigerators 1 and 1' may not only output simple colors, but also continuously turn on/off or change the colors to light the doors 20 and 20' so that the exteriors of the doors 20 and 20' are changed. A dynamic change in output state of the doors 20 and 20' by the lighting devices 36 and 36' may be referred to as an output pattern. Also, the output patterns may be synchronized with each other when the plurality of refrigerators 1 and 1' are disposed.

Hereinafter, a process of synchronizing and outputting output patterns of the plurality of refrigerators 1 and 1' will be described in more detail with reference to the drawings.

Figure 13:
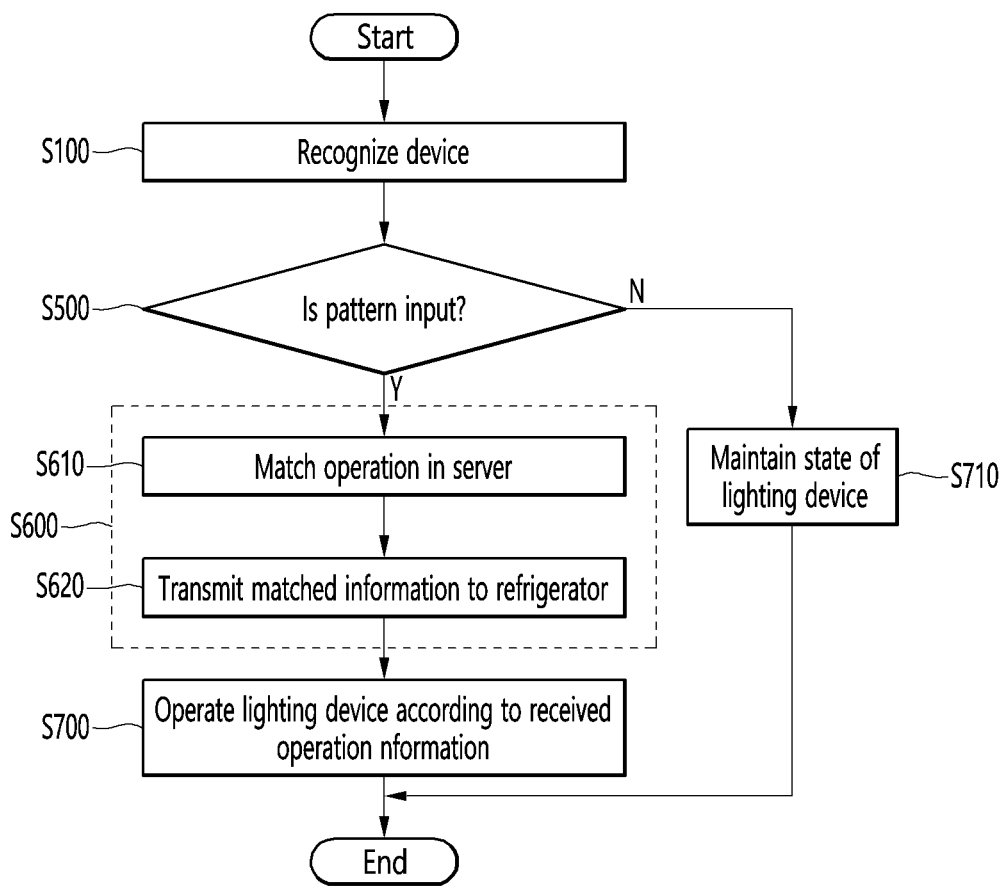
FIG. 13 is a flowchart sequentially illustrating an operation for synchronizing output patterns of the doors of the refrigerators.
Figure 14:
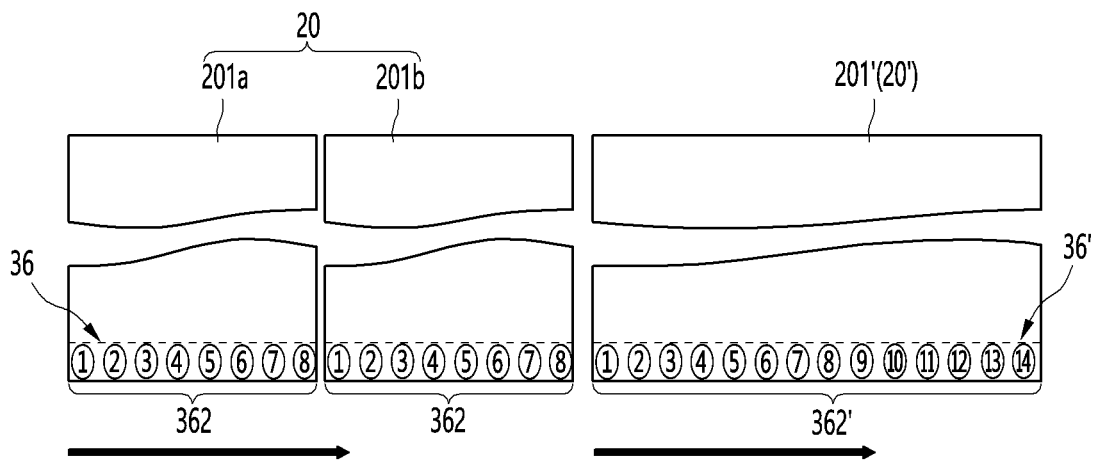
FIG. 14 is a schematic view illustrating operation states of lighting devices of the refrigerators.
Figure 15:
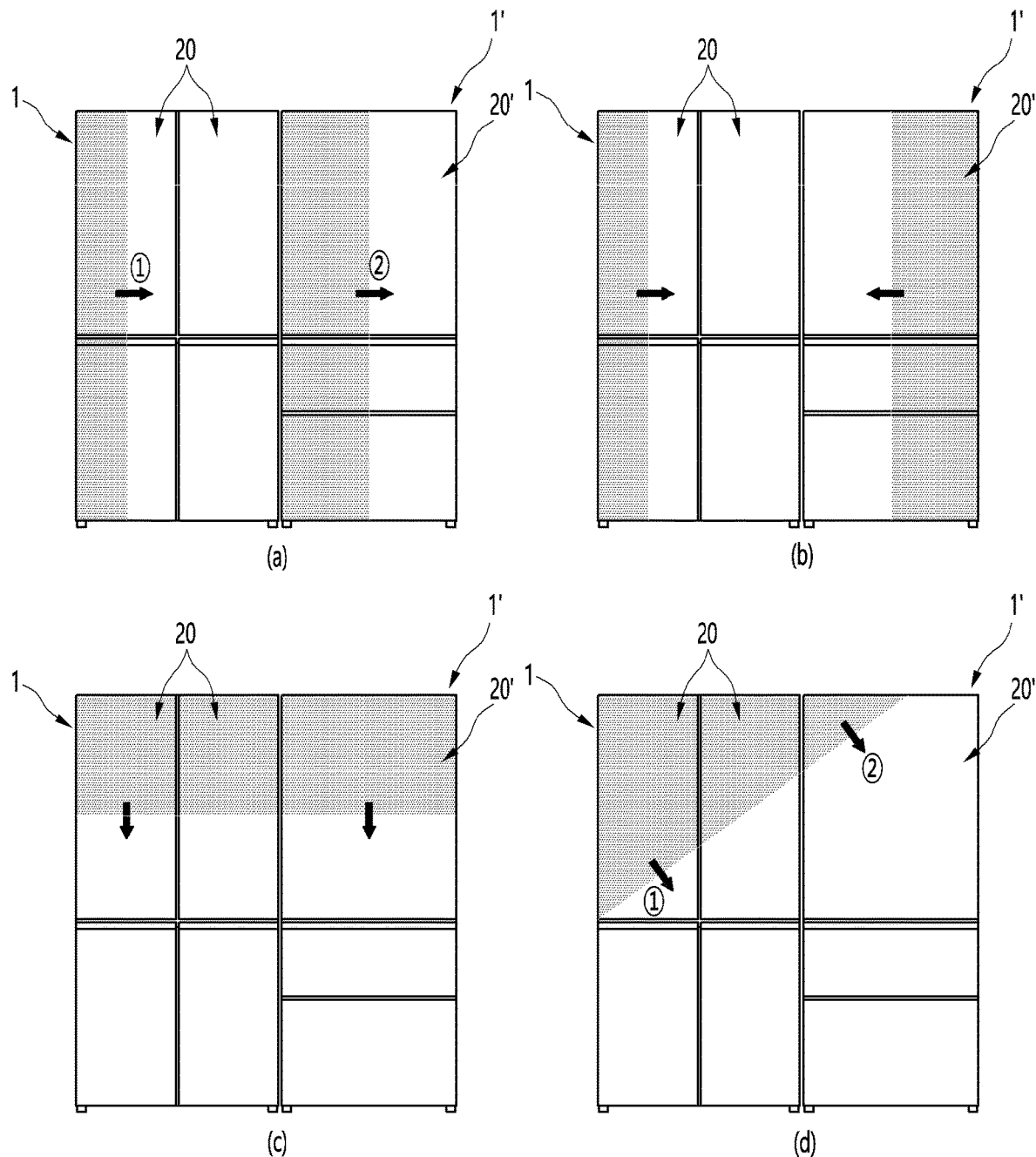
FIG. 15 is a view illustrating an example of the output patterns of the refrigerators.

FIG. 13 is a flowchart sequentially illustrating an operation for synchronizing output patterns of the doors of the refrigerators. FIG. 14 is a schematic view illustrating operation states of the lighting devices of the refrigerators. FIG. 15 is a view illustrating an example of the output patterns of the refrigerators.

As illustrated in the drawings, the first refrigerator 1 and the second refrigerator 1' may be installed side by side and recognized by the server 4. In addition, the server 4 may store information that has an influence on the colors output through the doors 20 and 20' such as the sizes and basic colors of the first refrigerator door 20 and the second refrigerator door 20', specifications of the lighting devices 36 and 36', and the like. [S100]

In this state, if the lighting devices 36 and 36' are turned off, the front exteriors of the refrigerators 1 and 1', that is, the front surfaces of the doors 20 and 20' may be turned off as illustrated in FIG. 1. In addition, when the lighting devices 36 and 36' are turned on, the front surfaces of the doors 20 and 20' may be in a state of expressing the set output color as illustrated in FIG. 12.

The user may select and input the output pattern in the state in which the first refrigerator 1 and the second refrigerator 1' are recognized by the server 4. Various examples of the output pattern are illustrated in FIG. 15.

The user may select and input the output pattern using the mobile device 3. Here, even if only one refrigerator is selected from the plurality of refrigerators 1 and 1', the output pattern may be simultaneously applied to the refrigerators 1 and 1' recognized by the server 4. [S500]

When the output pattern is selected, information input from the mobile device 3 may be transmitted to the server 4. In addition, the server 4 may match the operations of the lighting devices 36 and 36' of the first refrigerator 1 and the second refrigerator 1' based on the input information.

Here, the server 4 may match the operations so that the first lighting device 36 and the second lighting device 36' perform an operation interlocked with each other. That is, as the operations of the first lighting device 36 and the second lighting device 36' match each other, the first refrigerator door 20 and the second refrigerator door 20' may display an output pattern interlocked with each other.

The matched operation of the matching lighting devices 36 and 36' in the server 4 may include not only the on/off or color change of the lighting devices 36 and 36', but also the information for performing the output pattern such as an operation sequence, an operation time, an operation time interval, and the like of the plurality of LEDs 362 and 362', which constitute the lighting devices 36 and 36'. [S610]

The operation settings matched by the server 4 may be transmitted to the first refrigerator 1 and the second refrigerator 1'. That is, the operation setting transmitted from the server 4 may be transmitted to each of the first refrigerator 1 and the second refrigerator 1' through the communication unit 52.

Here, the first refrigerator 1 and the second refrigerator 1' may receive independent operations, but may operate to be interlocked with each other so as to perform the output pattern. That is, if only one output pattern is input, the first refrigerator 1 and the second refrigerator 1' may receive the matched operations from the server 4, respectively. [S620/S600]

In addition, the matched operation of the server 4 between the first refrigerator 1 and the second refrigerator 1' may be transferred to the control unit 51 to control the first lighting device 36 and the second lighting device 36'.

The lighting devices 36 and 36' of the first refrigerator 1 and the second refrigerator 1' may operate by the control unit 51, and the doors 20 and 20' may display selected output patterns, respectively. Hereinafter, examples of the output patterns appearing through the doors 20 and 20' will be described.

For example, as illustrated in FIGS. 14 and 15(a), the user may input an output pattern in which colors are sequentially changed from a left end of the first refrigerator 1 to a right end of the second refrigerator 1'.

Here, the first lighting device 36 and the second lighting device 36' may operate independently. In detail, the output color may be changed from the leftmost LED 362 disposed at the outermost side, that is, the first LED 362 of the first upper door 201a in the LEDs 362 disposed in the first lighting device 36, and the LEDs 362 may operate so that the colors are sequentially changed in a right direction. In addition, after an output color of an eighth LED 362 of the first upper door 201a is changed, a color of a first LED 362 of the second upper door 201b may be changed, and colors of the LEDs 362 in the right direction may be sequentially changed.

In addition, the second lighting device 36' disposed at the right side of the first refrigerator 1 may be set to operate to be interlocked with each other according to the sequence of the color change of the LEDs 362 of the first lighting device.

That is, after the output color of the eighth LED 362 disposed at the rightmost side of the first lighting device 36 is changed, the first LED 362' disposed at the leftmost side of the second lighting devices 36' may be changed. Subsequently, the colors of the LEDs 362' of the second lighting device 36' may also be sequentially changed from the left to the right.

In addition, for a natural interlocking operation of the first lighting device 36 and the second lighting device 36', the colors of the LEDs 362' of the second lighting device 36' may be changed according to the color change time of the LEDs 362 of the first lighting device 36.

That is, as illustrated in FIG. 15(a), the color change that starts at the left end of the first refrigerator door 20 may sequentially continue to the right side. In addition, when the color change proceeds to the right end of the first refrigerator door 20, the color change may be performed while continuing to the left end of the second refrigerator door 20'. In addition, the color change may be continuously performed up to the right end of the second refrigerator door 20', and the output pattern may be completed. Alternatively, the output pattern may be performed continuously or repeatedly.

As illustrated in FIG. 15(b), the user may input the output pattern in which the output states of the first refrigerator door 20 and the second refrigerator door 20' are changed at the same time. In addition, the server 4 may match the operations of the first lighting device 36 and the second lighting device 36' to display the output pattern.

The color change may start simultaneously at the left end of the first refrigerator door 20 and the right end of the second refrigerator door 20' by the selection of the output pattern. In addition, the color of the LEDs 362 of the first lighting device 36 may be sequentially changed from the left end to the right. In addition, the color of the LEDs 362' of the second lighting device 36' may be sequentially changed from the right end to the left.

Here, the sequential operation time of the LED 362' of the second lighting device 36' may match the sequential operation time of the LED 362 of the first lighting device 36 in consideration of the sizes of the doors 20 and 20'. Therefore, even when the sizes of the first refrigerator door 20 and the second refrigerator door 20' are different from each other, the refrigerator doors 20 and 20' may be controlled so that the time at which the color is changed at the right end of the first refrigerator door 20 and the time at which the color is changed at the left end of the second refrigerator door 20' are the same. That is, the exterior color change of the first refrigerator door 20 and the second refrigerator door 20' may be performed at the same time at both ends to proceed to adjacent positions and then finished at the same time.

As illustrated in FIG. 15(c), the user may input the output pattern in which the output states of the first refrigerator door 20 and the second refrigerator door 20' are changed vertically at the same time. In addition, the server 4 may match the operations of the first lighting device 36 and the second lighting device 36' to display the output pattern.

The colors of the first refrigerator door 20 and the second refrigerator door 20' may be changed vertically from the upper end to the lower end by the selection of the output pattern. In detail, the color change of the first refrigerator door 20 and the second refrigerator door 20' may start at the same time downward from the top end. In addition, the colors of the LEDs 362' of the first lighting device 36 and the second lighting device 36' may be simultaneously changed downward from the top end. In addition, the colors of the LEDs 362' of the first lighting device 36 and the second lighting device 36' may be changed at the same height.

That is, since the first refrigerator 1 and the second refrigerator 1' are synchronized with each other, the exterior color change may start at the same time, and the color change may proceed at the same height. In addition, the first lighting device 36 and the second lighting device 36' may sequentially operate up to the lower ends of the doors 20 and 20' by the setting operation so that the doors 20 and 20' display the output patterns.

As illustrated in FIG. 15(*d*), the user may input the output pattern in which the output states of the first refrigerator door 20 and the second refrigerator door 20' are changed at the same time at a time interval. In addition, the server 4 may match the operations of the first lighting device 36 and the second lighting device 36' to display the output pattern.

The color may be changed from an edge of a left upper end of the first refrigerator door 20 to an edge of a right lower end of the second refrigerator door 20' by the selection of the output pattern. In detail, the LED 362 disposed at the left upper end of the first refrigerator door 20 may operate to change the color and then sequentially operate toward the right lower end of the second refrigerator door 20' to change the color.

Here, the first lighting device 36 may operates first, and when the operated LED 362 reaches a set height, the second lighting device 36' may start the operation thereof. That is, as illustrated in the drawing, in the process of sequentially changing the colors in a diagonal direction, when operating to a position corresponding to the left upper end of the second refrigerator door 20', the change of the second lighting device 36' may start.

Thus, in the state in which the first lighting device 36 and the second lighting device 36' operate together, the colors of the LEDs 362 and 362' on the same extension line in the diagonal direction may be changed together. In addition, the LEDs 362 and 362' on the same extension line may sequentially operate toward the right lower end of the second refrigerator door 20' to change the colors. [S700]

In operation S500, when the output pattern is not input, the lighting devices 36 and 36' may be maintained in the previous operation state. That is, the lighting devices 36 and 36' may be maintained in the previous operation setting. [S710]

The home appliance according to the embodiment may match the operation of the lighting device provided on each of the doors of various other home appliances in addition to the refrigerator.

Figure 16:
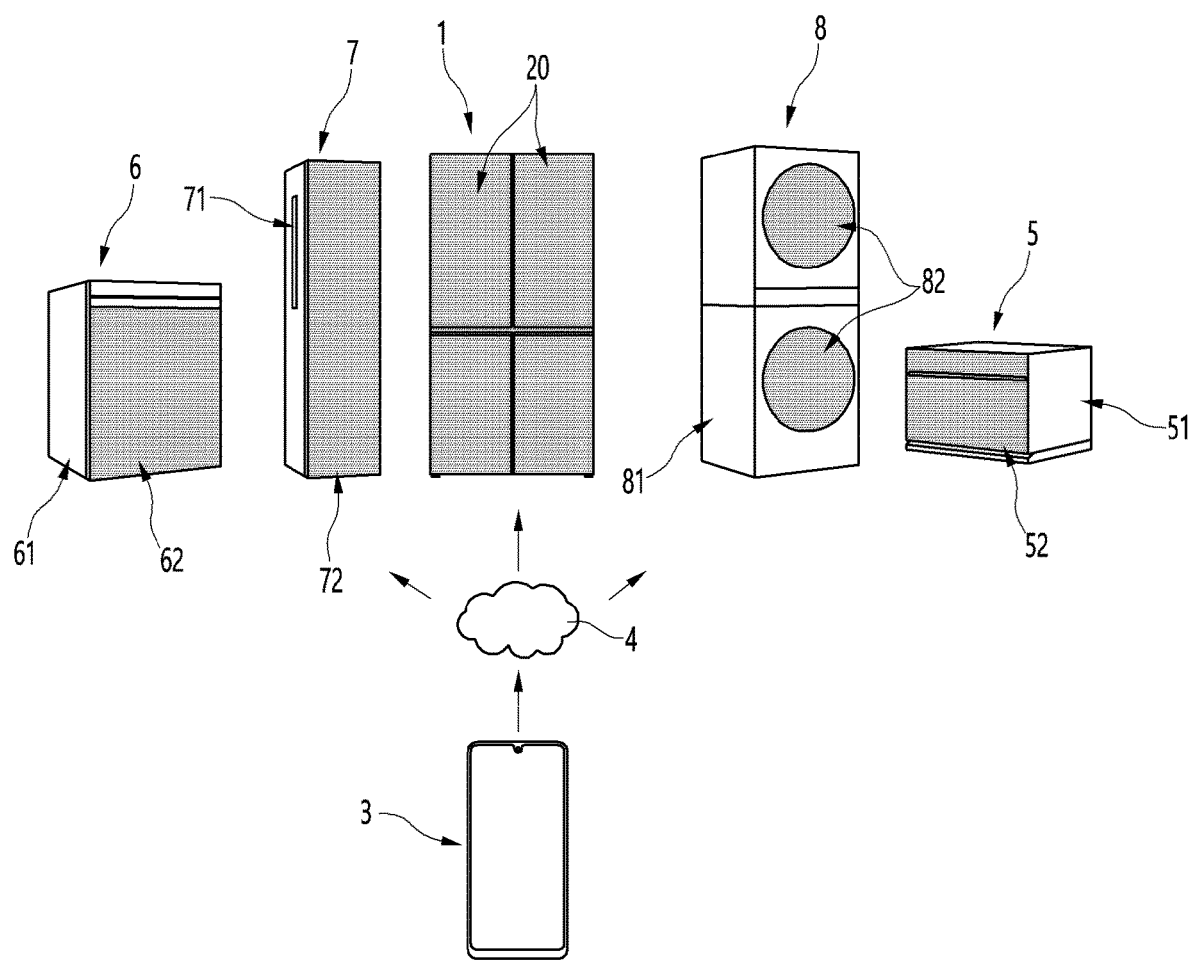
FIG. 16 is a view illustrating output states of doors of home appliances different from each other.

FIG. 16 is a view illustrating output states of doors of home appliances different from each other.

As illustrated in the drawing, home appliances 1, 5, 6, 7, and 8 according to an embodiment may be recognized by the server 4 as well as home appliances having the same type as well as hole appliances having different types. In addition, colors or output patterns of the home appliances 1, 5, 6, 7, and 8 may be set through the mobile device 3. In addition, the colors or output patterns of the home appliances 1, 5, 6, 7, and 8 may be directly input from one of the home appliances 1, 5, 6, 7, and 8.

In detail, the home appliances 1, 5, 6, 7, and 8 may include a refrigerator 1 having a structure capable of outputting colors, and a cooking appliance 5, a dishwasher 6, and a clothes care machine 7, and a washing machine 8.

The cooking appliance 5 may include a cabinet 51 defining a cooking space and a door 52 opening and closing the cooking space. In addition, the door 52 may have the same structure as the door 20 according to the foregoing embodiment. Thus, the colors may be output on a front surface of the door 52 by an operation of the lighting device 36 provided on the door 20.

The dishwasher 6 may include a cabinet 61 defining a washing space and a door 62 opening and closing the washing space. In addition, the door 62 may have the same structure as the door 20 according to the foregoing embodiment. Thus, the colors may be output on a front surface of the door 62 by an operation of the lighting device 36 provided on the door 20.

The clothes care machine 7 may include a cabinet 71 defining a clothes accommodation space and a door 72 opening and closing the clothes accommodation space. In addition, the door 72 may have the same structure as the door 20 according to the foregoing embodiment. Thus, the colors may be output on a front surface of the door 72 by an operation of the lighting device 36 provided on the door 20.

The washing machine 8 may include a cabinet 81 defining a laundry space and a door 82 opening and closing the laundry space. In addition, the door 82 may have the same structure as the door 20 according to the foregoing embodiment. Thus, the colors may be output on a front surface of the door 82 by an operation of the lighting device 36 provided on the door 20.

The home appliances 1, 5, 6, 7, and 8 may be disposed in an indoor space, embedded in furniture or a wall, or installed independently. In addition, the home appliances 1, 5, 6, 7, and 8 may be disposed adjacent to each other.

The home appliances 1, 5, 6, 7, and 8 may have different sizes and specifications, but the server 4 may match operations of lighting devices provided in the doors 20, 52, 62, 72, and 82 according to stored information of the home appliances 1, 5, 6, 7, and 8 so that front colors of the doors 20, 52, 62, 72, and 82 of the plurality of home appliances 1, 5, 6, 7, and 8 are equally displayed.

Here, when the user inputs the color of the standard home appliance (for example, the refrigerator 1) through the mobile device 3, the operations of the lighting devices may be matched to be transmitted so that other home appliances 5, 6, 7, and 8 output the same color. Here, the home appliance of which the color is input may be referred to as a first home appliance or mood home appliance, and the home appliance of which the color is output automatically may be referred to as second to fourth home appliance or subordinate home appliance.

In addition, the home appliances 1, 5, 6, 7, and 8 may have output patterns of the doors 20, 52, 62, 72, and 82, which are interlocked with each other, through operation matching of the lighting devices provided in the doors 20, 52, 62, 72, and 82 of the different home appliances 1, 5, 6, 7, and 8.

That is, even though Even if does not set each of the different types of home appliances 1, 5, 6, 7, and 8, if the color or output pattern of any one of the home appliances as a standard is input, the server 4 may output the automatically set colors or output the patterns by matching the operations of the lighting devices of other home appliances.

In addition to the foregoing embodiment, various embodiments may be exemplified.

According to another embodiment, in a single home appliance having a plurality of doors, an operation of a lighting device may be adjusted so that the plurality of doors appear to be the same color. In addition, in the components according to another embodiment, the same component as that according to the above-described embodiment may be described using the same reference numeral while omitting the detailed description and illustration.

In another embodiment, a refrigerator is described as an example for convenience of understanding and description, but it should be noted in advance that it is applicable to various other home appliances having doors.

Figure 17:
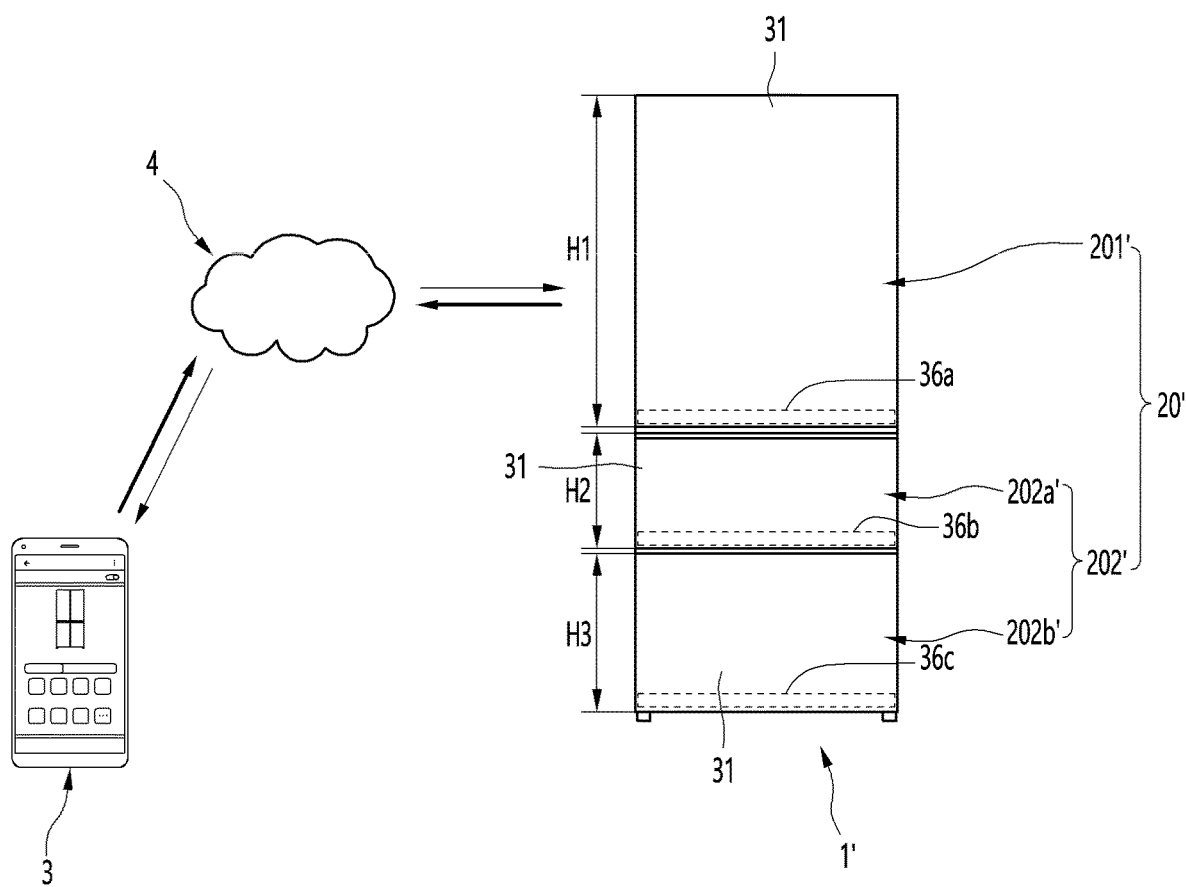
FIG. 17 is a front view of a refrigerator according to another embodiment.

FIG. 17 is a front view of a refrigerator according to another embodiment.

As illustrated in the drawing, a refrigerator 1 according to another embodiment may include a cabinet defining a storage space and a plurality of doors 20' opening and closing the storage space. The storage space may be provided in plurality and, for example, may be partitioned vertically.

The door 20' may include an upper door 201' disposed above the cabinet and a lower door 202' provided below the cabinet. In addition, the lower door 202' may be constituted by a first lower door 202a' and a second lower door 202b', which are disposed vertically. In addition, although not shown in detail, the upper door 201' may open and close the storage space by rotation thereof. In addition, the lower door 202' may be provided in a drawer type to open and close the storage space by being drawn in and out.

In another embodiment, for convenience of understanding and description, a structure in which a plurality of doors are arranged vertically is described as an example, but it should be noted in advance that it is applicable to various home appliances having a plurality of doors.

A panel 31 through which light is transmitted may be provided on a front surface of the upper door 201'. For example, the panel 31 may be made of a tempered glass material. The panel 31 may define entire or most of the front surface of the upper door 201' and may define a front exterior of the upper door 201'. In addition, the panel 31 may be provided to have a color when the lighting device 36a is turned off.

In addition, a lighting device 36a may be provided inside the upper door 201'. The lighting device 36a may be configured to emit light having various colors. Thus, the upper door 201' may be illuminated in a set color by an operation of the lighting device 36a. The lighting device 36a may have the same structure as the lighting device 36 of the above-described embodiment, and thus, a detailed description thereof will be omitted.

In addition, the upper door 201' may have a structure in which the panel assembly 30 according to the above-described embodiment is mounted.

The lower door 202' may be different from the upper door 201' only in a structure for expressing the exterior and color of the front surface except for a draw in/out manner of the upper door 201'.

The panel 31 may be provided on the front surface of the lower door 202'. The panel 31 may have the same structure as the panel 31 of the upper door 201'. In addition, the lower door 202' may be provided with lighting devices 36b and 36c. The lighting devices 36b and 36c may also have the same structure as the above-described lighting device 36a of the upper door 201'. Therefore, the lower door 202' may be shined in a set color by the operations of the lighting devices 36b and 36c.

In addition, the upper door 201' and the lower door 202' may have different sizes. For example, the upper door 201' and the lower door 202' may have the same horizontal width, but may have different vertical lengths. That is, the vertical length H1 of the upper door 201' may be provided to be the longest and be greater than each of the vertical lengths H2 and H3 of the first lower door 202a' and the second lower door 202b'. In addition, the vertical length H2 of the first lower door 202a' may be less than the vertical length H3 of the second lower door 202b'.

As described above, in a state in which the vertical lengths H1, H2, and H3 of the upper door 201' and the lower door 202' are different from each other, when the lighting devices 36a, 36b, and 36c of the upper door 201' and the lower door 202' operate in the same setting, colors output from the upper door 201' and the lower door 202' may appear to be different from each other.

In addition, the colors of the panels 31 of the upper door 201' and the lower door 202' may be different from each other. That is, the colors of the panels 31 shown when the lighting devices 36a, 36b, and 36c are turned off may be different from each other. When the lighting devices 36a, 36b, and 36c operate in the same setting while the panel 31 of the upper door 201' and the lower door 202' have different colors, the colors output from the upper door 201' and the lower door 202' may appear to be different from each other.

Therefore, when the user sets the color of either the upper door 201' or the lower door 202', the control unit 51 may control the operation of each of the lighting device 36a, 36b, 36c so that the colors of all the doors 20' appear to be the same.

For this, the refrigerator 1' may further includes a control unit 51 that controls the lighting devices 36a, 36b, and 36c, and a communication unit 52 for communication with the server 4 at a remote location at which information on the refrigerator 1' is stored.

That is, information of the refrigerator 1' including specifications of the door 20' may be stored in the server 4, and when any one color of the plurality of doors 20' is selected, the operations of the lighting devices 36a, 36b, and 36c may match each other so that all the doors 20' also have the same color.

Thus, the control unit 51 may control the operations of the lighting devices 36a, 36b, and 36c according to settings matched to be suitable for the specifications of each door 20'. That is, when the specifications of the door 20' are different from each other, the lighting devices 36a, 36b, and 36c may operate differently, and all of the doors 20' may appear to be the same color.

In addition, an output pattern may appear on the plurality of doors 20' according to an output pattern that is input as in the above-described embodiment. That is, when the output pattern of the door 20' is input, the server 4 may interlock and match the operations of the lighting devices 36a, 36b, and 36c, and the control unit 51 may control each of the lighting devices 36a, 36b, and 36c so that the output pattern is executed through the doors 20.

The refrigerator 1' and/or the server 4 may be connected to a mobile device 3 operated by a user. Thus, the user may check the color of the door 20' through the mobile device 3 or select and input the color of the door 20'. In addition, the output pattern may also be input and confirmed using the mobile device 3.

Alternatively, the mobile device 3 may be omitted if necessary, and the color of the door 20' may be input through direct manipulation of a manipulation unit 55 provided in the refrigerator 1'. In addition, the output pattern may be input through the manipulation of the manipulation unit 55.

In addition to the foregoing embodiment, various embodiments may be exemplified.

According to another embodiment, a color of a door having a see-through portion may match a color of another door in a single home appliance having a plurality of doors. In addition, in the components according to another embodiment, the same component as that according to the above-described embodiment may be described using the same reference numeral while omitting the detailed description and illustration.

Figure 18:
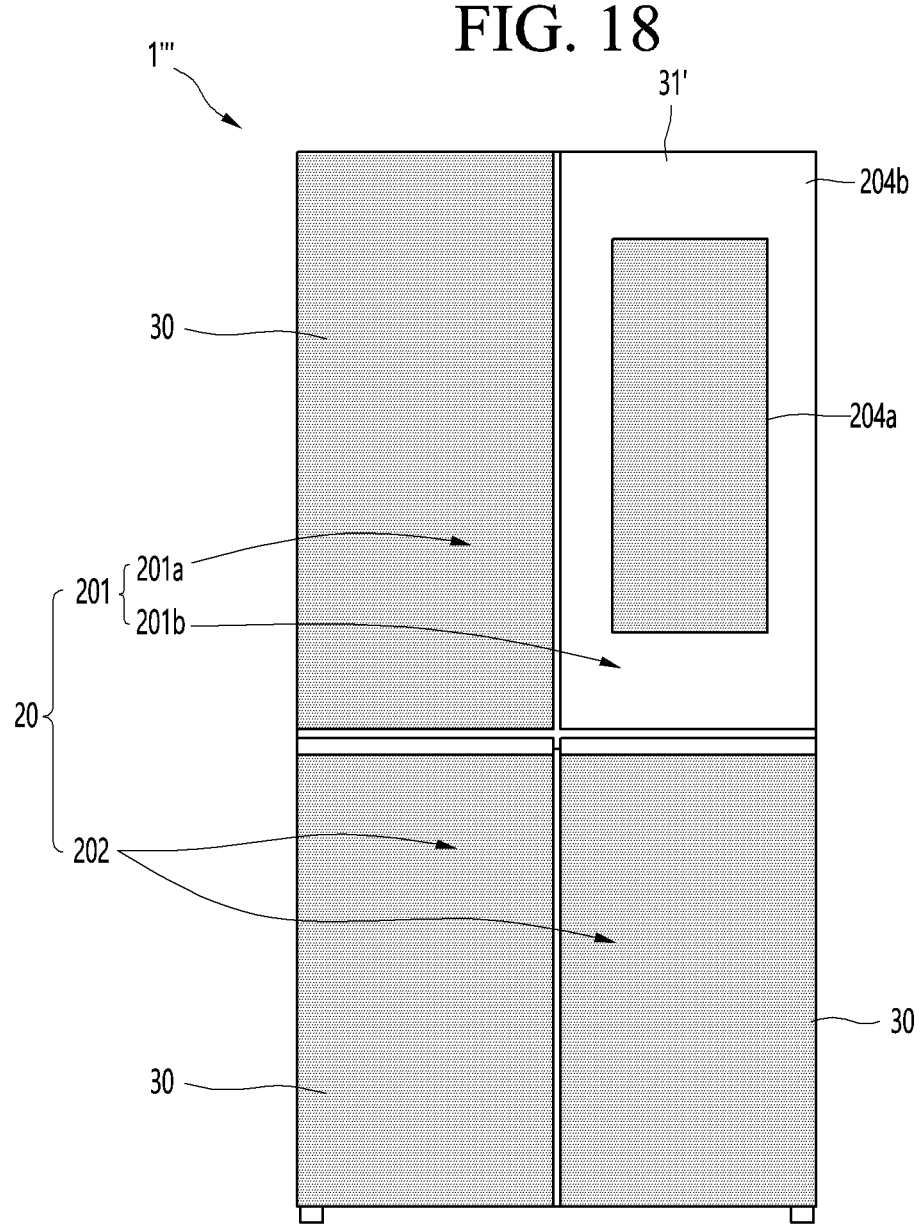
FIG. 18 is a front view of a refrigerator according to further another embodiment.
Figure 19:
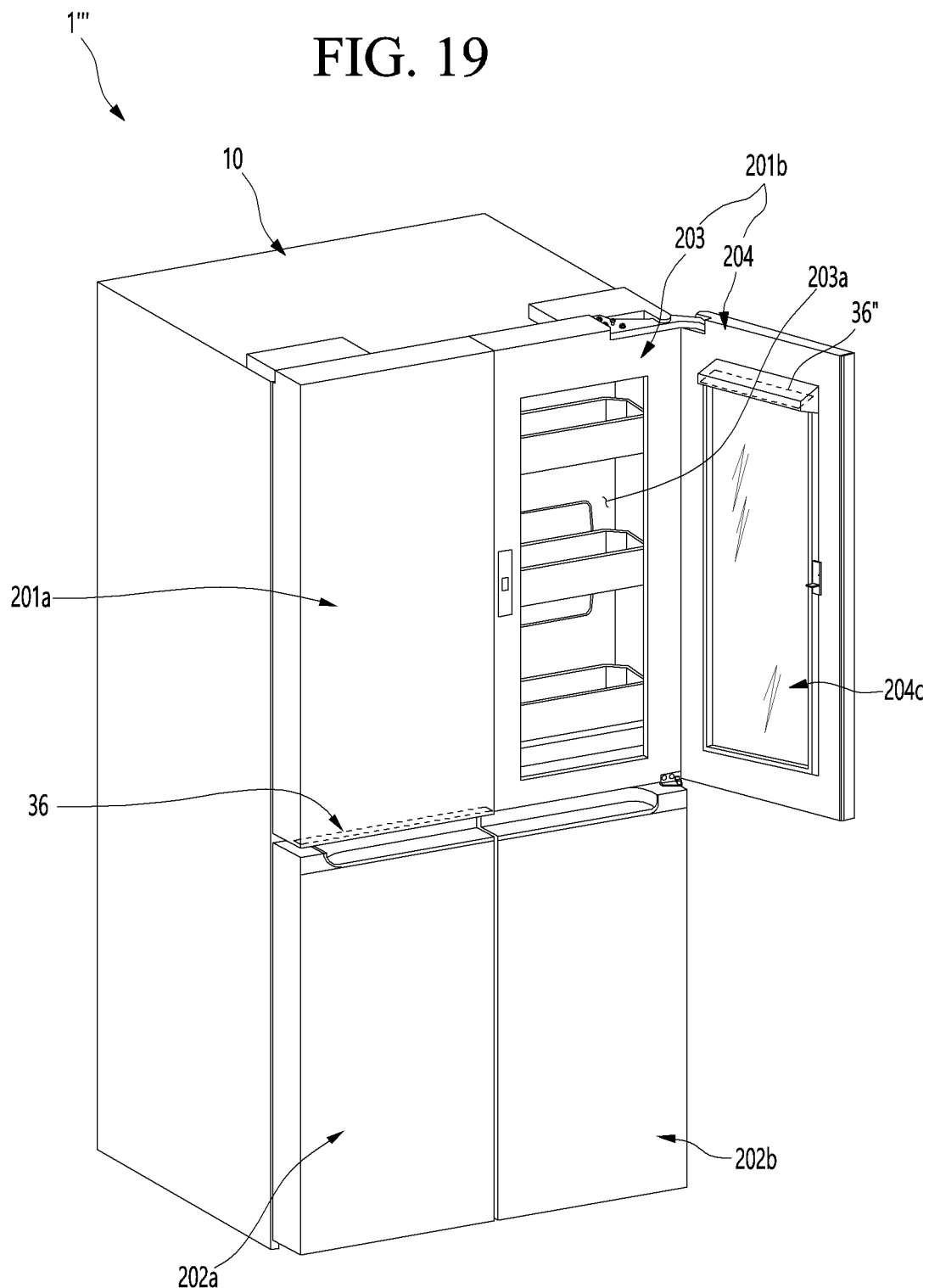
FIG. 19 is a perspective view of the refrigerator with a sub door opened.

FIG. 18 is a front view of a refrigerator according to further another embodiment. FIG. 19 is a perspective view of the refrigerator with a sub door opened.

As illustrated in the drawings, an outer appearance of a refrigerator 1''' according to an embodiment may be defined by a cabinet 10 in which a storage space is defined, and a door 20 for opening and closing the storage space of the cabinet 10.

For example, the cabinet 10 may define an upper storage space 11 (in FIG. 3) and a lower storage space 12 (in FIG. 3), which are partitioned vertically. A structure of the cabinet 10 may be the same as the structure disclosed in FIG. 3 according to the above-described embodiment. The door 20 may include an upper door 201 that opens and closes an upper storage space 11 by rotation thereof and a lower door 202 that opens and closes a lower storage space 12 by rotation thereof.

In addition, an outer appearance of the front surface of the refrigerator 1''' may be defined in the state in which the door 20 is closed and may define the out appearance of the refrigerator 1 viewed from the front in the state in which the refrigerator 1''' is installed.

The upper door 201 may include a first upper door 201a and a second upper door 201b, which are disposed at both left and right sides. In addition, the lower door 202 may include a first lower door 202a and a second lower door 202b, which are disposed at both left and right sides.

A front surface of the door 20 may shined in a set color.

The first upper door 201a and the lower door 202 may have the same structure except for only a mounting position and may be shined in a color set by the operation of the lighting device 36 as in the above-described embodiments. In addition, unlike the other doors 201a and 202, the second upper door 201b may be provided with a see-through portion 204a, and the see-through portion 204a may be shined by a see-through portion light 36".

A panel assembly 30 (in FIG. 2) may be provided on each of front surfaces of the first upper door 201a and the lower door 202. The panel assembly 30 may have the same structure as that of the above-described embodiment. In detail, the panel assembly 30 may include a panel 31 capable of transmitting light, and a lighting device 36 that emits light to the panel 31 to be shined in a set color.

Thus, each of the front surfaces of the first upper door 201a and the lower door 202 may have a set color according to the operation of the lighting device 36. The lighting device 36 may have the same structure as the lighting device 36 of the above-described embodiment and may include an RGB LED 362. Alternatively, the lighting device 36 may be configured separately from the panel 31 and installed inside the door 20. For example, the lighting device 36 may be provided at a lower end of each of the doors 201a and 202.

The see-through portion 204a may be provided in any one of the plurality of doors 20. The see-through portion 204a may be configured to see a space within the refrigerator. For example, the see-through portion 204a may be provided in the second upper door 201b. Alternatively, if necessary, the see-through portion 204a may be provided in a plurality of doors.

In detail, the second upper door 201b has a structure different from that of each of the doors 201a and 202 and may have a structure capable of seeing a rear space, that is, the space inside the refrigerator.

The second upper door 201b may include a main door 203 and a sub door 204. The main door 203 may be rotatably mounted on the cabinet 10 and may be configured to open and close the upper storage space 11 by rotation thereof. In addition, an opening 203a passing through the main door 203 may be defined in the main door 203. The opening 203a may be defined to pass through a portion other than a circumference of the main door 203, and at least a portion of the opening 203a may define a portion of the storage space in the refrigerator.

Also, the sub door 204 may be mounted on the main door 203. The sub door 204 may be rotatably mounted on the main door 203 and may open and close the opening 203a. Here, the sub door 204 may be provided to have the same size as the main door 203, and the front exterior of the second upper door 201b may be defined by the sub door 204 when viewed from a front side.

The sub door 204 may be provided with a see-through portion 204a. The see-through portion 204a may define at least a portion of a front surface of the sub door 204. For example, an opaque portion 204b having a predetermined width may be provided around the sub door 204, and a transparent portion 204a may be provided inside the opaque portion 204b. The opaque portion 204b may be maintained in a specific color and may not be changed in color. For example, the opaque portion 204b may be provided in black. In addition, the see-through portion 204a may have various colors according to user's setting. For example, the color of the see-through portion 204a may be interlocked with colors of the other refrigerator doors 201a and 202.

The see-through portion 204a may be configured to see the inside of the refrigerator and may be defined by a panel assembly 204c mounted on the sub door 204. The panel assembly 204c may be mounted on the sub door 204 and may block an opening passing through the sub door 204.

The panel assembly 204c may be provided as at least one or more see-through panels. In the panel assembly 204c, a plurality of transparent panels may be disposed in a front and rear direction, and a heat insulating layer may be provided therein. In addition, the panel assembly 204c may define at least a portion of front and rear surfaces of the sub door 204 in the mounted state. In addition, the panel assembly 204c may include a transparent display to display a screen through the see-through portion 204a. In addition, a coating layer for selective visualization of the transparent portion 204a may be provided on the panel assembly 204c. Thus, in a state in which the see-through portion light 36" is turned off, the inside of the see-through portion 204a may not be well seen. This state may be called an opaque state.

The see-through portion light 36" may be provided on the rear surface of the sub door 204. The see-through portion light 36" may be provided for the selective visualization of the see-through portion and may be provided at at least a side of a circumference of the see-through portion 204a. For example, the see-through portion light 36" may be provided on an upper end of the see-through portion 204a and may emit light toward the inside of the see-through portion 204a, that is, downward.

In addition, the see-through portion light 36" may be configured to emit light having various colors. For example, the see-through portion light 36" may be constituted by a substrate 361 and an RGB LED 362, like the lighting device 36.

Thus, when the light 36" of the see-through portion is turned on, a rear side of the see-through portion 204a may become bright, and the user may see the inside of the refrigerator through the see-through portion 204a from the outside. This state may be called a transparent state or a visible state. In addition, the see-through portion light 36" may allow the see-through portion 204a to be shined in a set color. In addition, the see-through portion light 36" may operate in synchronization with the lighting devices 36 of other doors 201a and 202. That is, when the operation of the lighting device 36 is determined, the operation of the see-through portion light 36" may be automatically determined. Here, the lighting device 36 and the see-through portion light 36" may have different structures.

For example, each of other doors 201*a* and 202 may have a structure in which the entire front surface is shined, but the see-through portion 204*a* may illuminate a relatively smaller area. Thus, there may be a difference between the number of LEDs provided in the lighting device 36 and the number of LEDs provided in the see-through portion light 36". In addition, brightness of the lighting device 36 may be provided to be brighter than that of the see-through portion light 36". That is, brightness of the front surface of each of the other doors 201*a* and 202 may be brighter than that of the see-through portion 204*a*.

In addition, the lighting device 36 may have a structure for displaying a color through the entire front surface of the doors 201*a* and 202, but the see-through portion light 36" may have a structure for illuminating the inside the see-through portion 204*a*. Therefore, the lighting device 36 and the see-through portion light 36" may have different outputs or different structures of the LEDs.

The difference between the lighting device 36 and the light 36" of the see-through portion may be compensated so that the color of the front surface of the see-through portion 204*a* and the other doors 201*a* and 202 are the same or harmonized with each other.

For this, the refrigerator 1''' may further include a control unit 51. The lighting device 36 and the transparent light 36" may be controlled by the control unit 51, and the front colors of the see-through portion 204*a* and the remaining doors 201*a* and 202 may be synchronized with each other. That is, the lighting device 36 and the see-through portion light 36" may be controlled in different settings, but the colors seen through the doors 201*a* and 202 and the see-through portion 204*a* may be the same or harmonized with each other.

In addition, the refrigerator 1''' may include a communication unit 52. The communication unit 52 may communicate with the server 4 in which information of the refrigerator 1''' is stored. Thus, the control unit 51 may receive the synchronized information of the lighting device 36 and the see-through portion light 36" from the server 4 so that the plurality of doors 201*a* and 202 have the same color.

For example, when the user selects a color of any one of the plurality of doors 20, the control unit 51 may set the operation of the lighting device 6 of each of the doors 201*a* and 202 so that the colors of the plurality of doors 201*a* and 202 are the same. In addition, the set information of each of the lighting devices 36 may be transmitted to the control unit 51, and the doors 201*a* and 202 may be shined in the same color.

In addition, the server 4 may set the operation of the see-through portion light 36" so that the color of the see-through portion 204*a* is the same as the color of each of the other doors 201*a* and 202. Alternatively, the reverse may also be possible. That is, information for the operation of the see-through portion light 36" may match each other in the server 4.

Thus, when the user inputs the color of any one door 20, the plurality of doors 201*a* and 202 including the see-through portion 204*a* may become the same color without separate color manipulation.

Alternatively, due to the characteristics of the structure, the color of the see-through portion 204*a* and the colors of the other doors 201*a* and 202 may not be exactly the same, but may be similar to or harmonized with each other. That is, the color of the see-through portion 204*a* may be automatically set and changed based on the colors of the other doors 201*a* and 202.

The refrigerator 1''' and/or the server 4 may be connected to a mobile device 3 operated by a user. Thus, the user may check the color of the door 20 through the mobile device 3 or select and input the color of the door 20. In addition, the output pattern may also be input and confirmed using the mobile device 3.

Alternatively, the mobile device 3 may be omitted if necessary, and the color of the door 20' may be input through direct manipulation of a manipulation unit 55 provided in the refrigerator 1'''. In addition, the output pattern may be input through the manipulation of the manipulation unit 55.

The home appliance and the method for controlling the home appliance according to the embodiment may expect the following effects.

According to the embodiment, the color of the door of the home appliance may be changed by the operation of the lighting device, and the colors of the plurality of doors may be controlled to more match each other, thereby improving the exteriors with the sense of unity.

Particularly, even if the specifications (size, basic color, lighting device structure) between the doors are different from each other, the operation of each lighting device may be adjusted so that the doors appear to have the same front color.

In addition, the see-through portion light that illuminates the see-through portion through which the inside of the home appliance is seen in the plurality of doors provided in the home appliance may operate in harmony based on the operation of the lighting device of another door, and thus, the see-through portion and the front color of the other door may match each other.

In addition, the information for controlling the door lighting device may be stored in the server, and the information of the server may be received through the communication so that the plurality of doors are displayed in the same color. In addition, the color of the door may be changed by manipulating the mobile device connected to the server to improve the convenience in use.

Even through the plurality of home appliances are installed, when the user inputs the door color of one home appliance, the door color of the other home appliance may match each other to have the same exterior color.

Therefore, in the situation in which the plurality of home appliances are installed, if the user inputs the color of one home appliance without setting the exterior color of each home appliance, the exterior color of the other home appliances may be changed at once to improve usability.

Particularly, when the plurality of home appliances have different door specifications, or when the lighting devices are identically controlled in the doors of the different types of home appliances, the colors of the doors may appear differently. However, in the plurality of home appliances, the setting of the lighting device provided in each of the doors may be adjusted using the information stored in the server so that the doors have the same color.

In addition, when the output pattern is selected, the lighting devices of the plurality of doors may operate to be interlocked with each other. Particularly, if the user only inputs one output pattern, the server may allow the operations of the door lightings to match each other in the server so as to transmit the matched operations so that the plurality of home appliances display the interlocked output pattern. Therefore, the usability may be further improved, and the exterior may be more improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus comprising:
a first door configured to open and close a first region of a first home appliance;
a first lighting device provided in the first door and configured to display a first color;
a second door configured to open and close a second region of a second home appliance;
a second lighting device provided in the second door and configured to display a second color;
a mobile device configured to communicate with a server and control the second door to change the displayed second color to the first color; and
a control unit configured to communicate with the server and control the second lighting device to change the displayed second color to the first color in the second door,
wherein at least one door of the first door and the second door comprises:
a see-through portion through which a space within a refrigerator is displayed, and
a see-through portion light configured to enable visibility into a rear space of the see-through portion according to a turn on/off state of the see-through portion light and configured to emit light in various colors, and
wherein the control unit is configured to control an operation of the see-through portion light with the first lighting device or the second lighting device for simultaneous operation.

2. The apparatus according to claim 1, further comprising a communication unit configured to communicate with a server, the server being configured to store information regarding the second home appliance,
wherein the control unit is configured to control the second lighting device according to operation information of the second lighting device, the operation information being received from the server.

3. The apparatus according to claim 1, wherein the first door and the second door have distinct door specifications from one another, and
wherein each of the door specifications comprises at least one of:
a color of a panel configured to define a front surface of a respective door,
a size of the respective door, or
a structure of a lighting device in the respective door.

4. The apparatus according to claim 3, wherein the first lighting device and the second lighting device having the distinct door specifications are controlled according to operation information different from each other.

5. The apparatus according to claim 1, further comprising a manipulation unit configured to receive input of the colors of the first door and the second door.

6. The apparatus according to claim 1, wherein the mobile device is configured to receive input of the first color of the first door and the second color of the second door.

7. The apparatus according to claim 1, wherein the control unit is configured to control the see-through portion light so that the color of the first door or the second door matches a color of the see-through portion.

8. The apparatus according to claim 1, wherein the control unit is configured to, based on the first color of the first door being input, control the second lighting device so that the second color of the second lighting device matches the first color.

9. The apparatus according to claim 8, wherein the first home appliance and the second home appliance comprise at least two or more combinations of a refrigerator, a cooking appliance, a dishwasher, a clothes care machine, and a washing machine.

10. The apparatus according to claim 9, wherein the control unit is configured to allow the second lighting device to operate based on an operation time or sequence of the first lighting device.

11. The apparatus according to claim 8, wherein the first home appliance and the second home appliance comprise different home appliances having distinct door specifications from one another, and
wherein each of the door specifications comprises at least one of:
a color of a panel configured to define a front surface of a respective door,
a size of the respective door, or
a structure of a lighting device in the respective door.

12. The apparatus according to claim 8, wherein the control unit is configured to, based on an output pattern of the first door being input, control the second lighting device of the second door so that the first lighting device and the second lighting device are interlocked with each other to operate.

13. The apparatus according to claim 1, wherein each of the first lighting device and the second lighting device comprise a plurality of red, green, blue (RGB) light-emitting diodes (LEDs) disposed on a substrate and configured to selectively emit light in various colors.

14. A method for controlling a home appliance, the method comprising:
recognizing the home appliance in a server;
inputting a color of any one of a plurality of doors of the home appliance;
matching operation information of a plurality of lighting devices provided in the plurality of doors to output the input colors of the plurality of doors; and
operating the plurality of lighting devices to synchronize the colors of the plurality of doors according to the operation information,
wherein the home appliance is provided in plurality, and each of the plurality of home appliances is recognized in the server,
wherein operation information of the plurality of lighting devices match each other according to door specifications of the plurality of home appliances, and
wherein each of the door specifications comprises a size of the respective door or a structure of a lighting device in the respective door.

15. The method according to claim 14, wherein, after matching in the server, operation information of a lighting device of a door, where no color is input among the plurality of doors, is transmitted to a control unit of the home appliance.

16. The method according to claim 14, further comprising inputting an output pattern appearing on the plurality of doors of the plurality of home appliances,
- wherein, based on the output pattern being input, the plurality of lighting devices of the plurality of home appliances display the output pattern by operations interlocked with each other.

17. A non-transitory computer readable medium comprising instructions which, when executed by a computer, cause the computer to carry out the method of claim 14.

* * * * *